(12) United States Patent
Reinhardt et al.

(10) Patent No.: US 8,073,210 B2
(45) Date of Patent: Dec. 6, 2011

(54) METHODS OF SMOOTHING SEGMENTED REGIONS AND RELATED DEVICES

(75) Inventors: Joseph Reinhardt, Iowa City, IA (US); Milan Sonka, Coralville, IA (US); Geoffrey McLennan, Iowa City, IA (US); Eric Hoffman, Iowa City, IA (US); Soumik Ukil, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 1256 days.

(21) Appl. No.: 11/355,321

(22) Filed: Feb. 14, 2006

(65) Prior Publication Data

US 2007/0053562 A1 Mar. 8, 2007

Related U.S. Application Data

(60) Provisional application No. 60/652,695, filed on Feb. 14, 2005.

(51) Int. Cl.
*G06K 9/00* (2006.01)
*G06K 9/40* (2006.01)

(52) U.S. Cl. .................. 382/128; 382/154; 382/260

(58) Field of Classification Search .............. 382/199, 382/190, 168–172, 128–132, 260, 154; 128/922
See application file for complete search history.

(56) References Cited

U.S. PATENT DOCUMENTS

| | | | |
|---|---|---|---|
| 6,246,784 B1 * | 6/2001 | Summers et al. ............ 382/128 |
| 6,282,307 B1 * | 8/2001 | Armato et al. ................ 382/132 |
| 6,724,925 B2 * | 4/2004 | Armato et al. ................ 382/132 |
| 6,766,043 B2 * | 7/2004 | Zeng et al. .................... 382/128 |
| 6,813,375 B2 * | 11/2004 | Armato, III et al. ......... 382/131 |
| 7,315,639 B2 * | 1/2008 | Kuhnigk ....................... 382/131 |
| 7,483,023 B2 * | 1/2009 | Cardenas et al. ............ 345/419 |
| 7,548,649 B2 * | 6/2009 | Cardenas et al. ............ 382/173 |
| 2002/0114503 A1 | 8/2002 | Klotz et al. ................... 382/131 |
| 2003/0022367 A1 | 1/2003 | Xu ................................ 435/366 |
| 2003/0095696 A1 | 5/2003 | Reeves et al. ................ 382/131 |
| 2003/0099384 A1 | 5/2003 | Zeng et al. .................... 382/128 |
| 2003/0099389 A1 | 5/2003 | Zeng et al. .................... 382/131 |
| 2003/0099390 A1 | 5/2003 | Zeng et al. .................... 382/131 |
| 2003/0223627 A1 | 12/2003 | Yoshida et al. .............. 382/128 |
| 2005/0207630 A1 * | 9/2005 | Chan et al. ................... 382/131 |
| 2006/0030958 A1 | 2/2006 | Tschirren et al. .............. 700/90 |
| 2009/0252395 A1 * | 10/2009 | Chan et al. ................... 382/131 |

OTHER PUBLICATIONS

Pal'agyi et al, Quantitative Analysis of Intrathoracic Airway Trees: Methods and Validation, IPMI 2003, LNCS 2732, pp. 222-233, 2003, Springer-Verlag Berlin Heidelberg 2003.*
Brown et al, Method for Segmenting Chest CT Image Data Using an Anatomical Model: Preliminary Results, IEEE Transactions on Medical Imaging, Vol. 16, No. 6, December 1997.*
Fetita et al , 3D Automated Lung Nodule Segmentation in HRCT, MICCAI 2003, LNCS 2878, pp. 626-634, Springer-Verlag Berlin Heidelberg 2003.*
U.S. Appl. No. 60/568,184, filed May 5, 2004, Tschirren et al.
Armato et al., "Computerized detection of pulmonary nodules on CT scans," *Radiographics*, 19(5): 1301-1311, 1999.

(Continued)

*Primary Examiner* — Gregory M Desire
*Assistant Examiner* — Andrae S Allison
(74) *Attorney, Agent, or Firm* — Fulbright & Jaworski L.L.P.

(57) ABSTRACT

Automated methods for segmenting and smoothing volumes of interest, such as the mediastinal boundary of a lung. Devices and systems configured to perform the automated methods.

52 Claims, 21 Drawing Sheets

OTHER PUBLICATIONS

Bland and Altman, "Statistical methods for assessing agreement between two methods of clinical measurement," *Lancet*, 1(8476): 307-310, 1986.

Brown et al., "Method for segmenting chest CT image data using an anatomic model: Preliminary results," *IEEE Trans. Medical Imaging*, 16: 828-839, 1997.

Chalana and Kim, "A methodology for evaluation of boundary detection algorithms on medical images," *IEEE Trans. Medical Imaging*,;16(5): 642-652, 1997.

da Fontoura Costa and Cesar Jr., "Table of Contents," In: Shape Analysis and Classification: Theory and Practice, *CRC Press*, Boca Raton, Florida, 2001.

Dawant et al., "Automatic 3-D segmentation of internal structures of the head in MR images using a combination of similarity and free-form transformation: Part I, methodology and validation on normal subjects," *IEEE Trans. Medical Imaging* 18(10):909-916, 1999.

Dogdas et al., "Segmentation of skull in 3D human MR images using mathematical morphology," *Proc. SPIE Medical Imaging 2002: Image Processing*, 4684:1553-1562, 2002.

Höhne and Hanson, "Interactive 3D segmentation of mri and ct volumes using morphological operations," *Computer Assisted Tomography*, 16:258-294, 1992.

Hu et al., "Automatic lung segmentation for accurate quantitation of volumetric X-ray CT images," *IEEE Trans. Medical Imaging*, 20(6): 490-498, 2001.

Hunter, "Gray-scale morphology," Nov. 29, 2002.

Kuhnigk et al., "Lung lobe segmentation by anatomy-guided 3D watershed transform," *Medical Imaging* 2003, 4, 2003.

Li et al., "Improved method for automatic detection of lung regions in chest radiographs," *Acad. Radiology*, 8: 629-638, 2001.

Lohmann and von Cramon, "Automatic labelling of the human cortical surface using sulcal basins," *Proc.of SPIE*, 5032:1482-1490, 2003.

Lürig and Ertl, "Hierarchical volume analysis and visualization based on morphological operators," *IEEE Visualization Archive, Proceedings of the Conference on Visualization '98*, pp. 335-341, 1998.

Megalooikonomou et al., "Fast and effective characterization of 3D region data," *Proceedings of the International Conference on Image Processing*, 1:I-424, 2002.

Palágyi et al., "Quantitative analysis of intrathoracic airway trees: methods and validation, in Proc. 18th Int. Conf. Information Processing in Medical Imaging," *IPMI* 2003, Ambleside, UK, Lecture Notes in Computer Science, 2732(7): 222-233, 2003.

Ruetter et al., "Nonlinear edge preserving smoothing and segmentation of 4-D medical images via scale-space fingerprint analysis," *IPMI 2001: 17th International Conference*, pp. 431-437.

Salfity et al., "A computer-aided diagnosis method for automated detection and classification of clustered microcalcifications in mammograms," Proceedings of the Argentine Symposium on Healthcare Informatics, Tandil, pp. 41-47, 2000.

Silva et al., "Segmentation and reconstruction of the pulmonary parenchyma," Technical Report, Vision and Graphics Laboratory, Institute of Pure and Applied Mathematics, Rio de Janeiro, 2002.

Tschirren et al., "Airway tree segmentation using adaptive regions of interest," Medical Imaging 2004: Physiology, Function, and Structure from Medical Images, Proceedings of the SPIE, vol. 5369, pp. 117-124 (2004).

Tschirren, "Segmentation, anatomical labeling, branchpoint matching, and quantitative analysis of human airway trees in volumetric CT images," Ph.D. Thesis, University of Iowa, Aug. 2003.

Tschirren, "Segmentation, branchpoint matching and anatomical labeling of human airway trees in volumetric CT images," slides presented at Ph.D. defense, which occurred on Jul. 10, 2003.

Ukil and Reinhardt, "Smoothing Lung Segmentation Surfaces in 3-D X-ray CT images using Anatomic Guidance," SPIE *Conf. Medical Imaging*, 5370: 1066-1075, 2004.

Yang and Hansell, "CT image enhancement with wavelet analysis for the detection of small airways disease," *IEEE Transaction on Medical Imaging*, 16:953-961, 1997.

\* cited by examiner

METHODS OF SMOOTHING SEGMENTED REGIONS AND RELATED DEVICES

CROSS-REFERENCE(S) TO RELATED APPLICATION(S)

This application claims priority to U.S. Provisional Patent Application Ser. No. 60/652,695, filed Feb. 14, 2005, the entire contents of which are expressly incorporated by reference.

STATEMENT REGARDING FEDERALLY SPONSORED RESEARCH

The government may own rights in this invention pursuant to (a) National Institute of Health grant HL64368 and/or (b) National Science Foundation grant 0092758.

BACKGROUND

1. Field of the Present Methods and Devices

The present methods and devices relate generally to the fields of segmentation and smoothing. More particular, they relate to segmenting a volume of interest (e.g., lung parenchyma) from a volumetric dataset of images, and then performing smoothing operations on certain portions of the volume of interest (e.g., the mediastinal boundary of the lung parenchyma) based on certain criteria (e.g., the airway tree).

2. Description of Related Art

Automatic lung segmentation in volumetric computed tomography (CT) images has been extensively investigated, and several methods have been proposed. Most methods distinguish the lung parenchyma from the surrounding anatomy based on the difference in CT attenuation values. This leads to an irregular and inconsistent lung boundary for the regions near the mediastinum, which can cause inconsistent boundaries both across subjects, and within subjects scanned at different intervals of time. Processes like lung image registration and lung atlas construction can be affected by such inconsistencies.

The first step in any CT-image based pulmonary analysis is the identification of the lungs. Given the large size of CT datasets, manually segmenting the lungs is tedious and prone to interobserver variations. There are a number of computer-assisted and fully automatic methods that have been proposed for human lung segmentation from CT images. Brown et al. [1] proposed a knowledge-based approach to the segmentation problem, with an anatomical model, an inference engine, and image processing routines which communicate with them. Hu et al. [2] proposed a fully automatic method for lung extraction, left and right lung separation, and lung contour smoothing.

Most of the techniques for segmenting the lungs in CT images use gray-level processing to distinguish between the low density lung regions and denser surrounding tissue. The lung regions near the mediastinum contain the radiodense pulmonary arteries and veins, which are excluded from the lung regions due to this processing (see FIGS. 1A and 1B). This gives rise to indentations in the surface of the lungs near the mediastinum. When manually tracing the lung contours, a manual analyst may trace across the large pulmonary vessels and group them with the lung regions (FIG. 1C), yielding a smooth lung contour. Manual editing of this sort can be extremely time consuming given that a typical dataset may contain 500 slices or more. Also, because manual editing is typically done on one cross-sectional view at a time, i.e., transverse, coronal or sagittal, it does not ensure 3-D smoothness of the lung boundary.

A similar situation occurs as the mainstem bronchi merge into the lungs. Gray-scale thresholding may include these large airways with the lung regions because of their low attenuation values partial volume effects (see FIGS. 1D and 1E). This behavior may not be consistent across slices, so a big airway segment included in one slice may be missing on another slice. This causes the lung boundary to have an irregular appearance, especially when seen in the coronal and sagittal views (FIG. 1F). Manual analysts may trace lung borders around the airways, or they trace across them. These factors can be a source of problems in applications such as vascular tree segmentation and 3-D lung registration, which depend on consistent lung boundaries.

Hu et al. [2] suggested a lung contour smoothing method as an optional, post-segmentation step. They identified three major reasons for unsmoothness near the mediastinum: the pulmonary vessels; the large airways; and the small airways. For each of these cases a series of binary morphology and connected component analysis based steps were given. All these operations were performed in 2-D on transverse slices only, therefore unsmoothness remained in other views.

As part of their work on pulmonary nodule detection, Armato et al. [3] use a rolling ball algorithm followed by linear interpolation to fill in indentations in the lung contour. These operations are also performed on transverse slices.

Li et al. [4] proposed a method for automatic lung identification in chest radiographs which incorporates a mediastinal smoothing step involving a N point averaging operator applied to edge pixels. This work has not been extended to 3-D CT images.

SUMMARY

The present methods and devices provide automated methods of segmenting a desired volume of interest from a volumetric dataset of images, using an aspect of anatomy to define a three-dimensional (3-D) bounding structure in which certain smoothing operations are performed, and performing localized smoothing operations within the bounding structure based on an aspect of anatomy. Although the volume of interest discussed in this application is lung parenchyma, one of ordinary skill in the art will recognize that the present methods and devices may be applied to any desired structure appearing in any suitable volumetric dataset of images.

In some embodiments, the present automated methods are for smoothing a segmented lung volume that does not include the trachea, the right main bronchus, or the left main bronchus, but that does include a mediastinal boundary, and the automated method includes, consists of, or consists essentially of accessing a volumetric dataset of images containing the segmented lung volume; and performing smoothing operations on lung contours within images contained within a three-dimensional (3-D) bounding structure that encloses the mediastinal boundary of the segmented lung volume, the 3-D bounding structure having a top and a bottom, the 3-D bounding structure including fewer than all of the images in the volumetric dataset.

In other embodiments: the 3-D bounding structure is a box defined at the top by the apical-most image in the volumetric dataset that contains an airway segment lying outside the segmented lung volume; the 3-D bounding structure is defined at the bottom by the basal-most image in the volumetric dataset that contains an airway segment lying outside the segmented lung volume; the volumetric dataset includes 300 to 600 images taken with a computed tomography scanner; the images in the volumetric dataset are each 0.5 millimeters thick; the smoothing operations include, consist of, or consist essentially of using top discs of increasing size to smooth lung contours within a top set of images in the 3-D bounding structure such that a first top disc used to smooth a lung contour within a first top image has a smaller radius than a second top disc used to smooth a lung contour within a second top image that is located farther from the top of the 3-D bounding structure than the first top image; the radii of the top discs of increasing size range from 0 pixels to 30 pixels; 10 top discs are used; the smoothing operations also include, consist of, or consist essentially of using bottom discs of increasing size to smooth lung contours within a bottom set of images in the 3-D bounding structure such that a first bottom disc used to smooth a lung contour within a first bottom image has a smaller radius than a second bottom disc used to smooth a lung contour within a second bottom image that is located farther from the bottom of the 3-D bounding structure than the first bottom image; the radii of the bottom discs of increasing size range from 0 pixels to 30 pixels; 10 bottom discs are used; the smoothing operations also include, consist of, or consist essentially of using morphological closing with a 3-D structuring element to smooth lung contours within images located between the images in the top set and the bottom set, thus achieving an initial smoothed lung volume within the 3-D bounding structure; the 3-D structuring element is an ellipsoid; the ellipsoid has an X dimension of 1.8 centimeters, a Y dimension of 1.8 centimeters, and a Z dimension of 0.9 centimeters; the 3-D structuring element is a sphere; the smoothing operations also include, consist of, or consist essentially of determining a difference between the initial smoothed lung volume and the segmented lung volume to yield a first intermediate smoothed lung volume; the smoothing operations also include, consist of, or consist essentially of performing a 3-D connected component analysis on the first intermediate smoothed lung volume to yield one or more volumetric regions; the smoothing operations also include, consist of, or consist essentially of determining which volumetric regions to retain to achieve a final smoothed lung volume, the determining including retaining a volumetric region if the volumetric region overlap a previously-segmented airway tree; the determining includes, consists of, or consists essentially of discarding a volumetric region if the volumetric region does not overlap the previously-segmented airway tree.

In some embodiments, the smoothing operations are performed on one lung at a time.

Some embodiments of the present devices include a computer readable medium comprising, consisting of, or consisting essentially of machine readable instructions for performing at least the steps of any of the methods above.

Some embodiments of the present devices include a microprocessor configured to perform at least the steps of any of the methods above.

Some embodiments of the present devices include a computer system configured to perform at least the steps of any of the methods above.

BRIEF DESCRIPTION OF THE DRAWINGS

The following drawings are relevant to the present methods and devices.

FIG. 1A shows a transverse slice with blood vessels highlighted; FIG. 1B shows the automatic segmentation of the lung boundary depicted in FIG. 1A using the method described in commonly-owned U.S. Ser. No. 11/122,974 ("the '974 application"), filed May 5, 2005, and in appendix 1 of commonly-owned U.S. Ser. No. 60/568,184 ("the '184 provisional application"), filed May 5, 2004 (which is the provisional application to which the '974 application claims priority); FIG. 1C shows the segmented lung boundary depicted in FIG. 1A with vessels included in the lung boundary; FIG. 1D shows a sample transverse slice with airways highlighted; FIG. 1E shows the automatic segmentation of the lung boundary depicted in FIG. 1D using the method described in the '974 application and in appendix 1 of the '184 provisional application; and FIG. 1F shows a coronal view of a segmented lung from the same volumetric dataset as the other images in FIGS. 1A-1E, showing discontinuities;

DETAILED DESCRIPTION

Figure 1A:
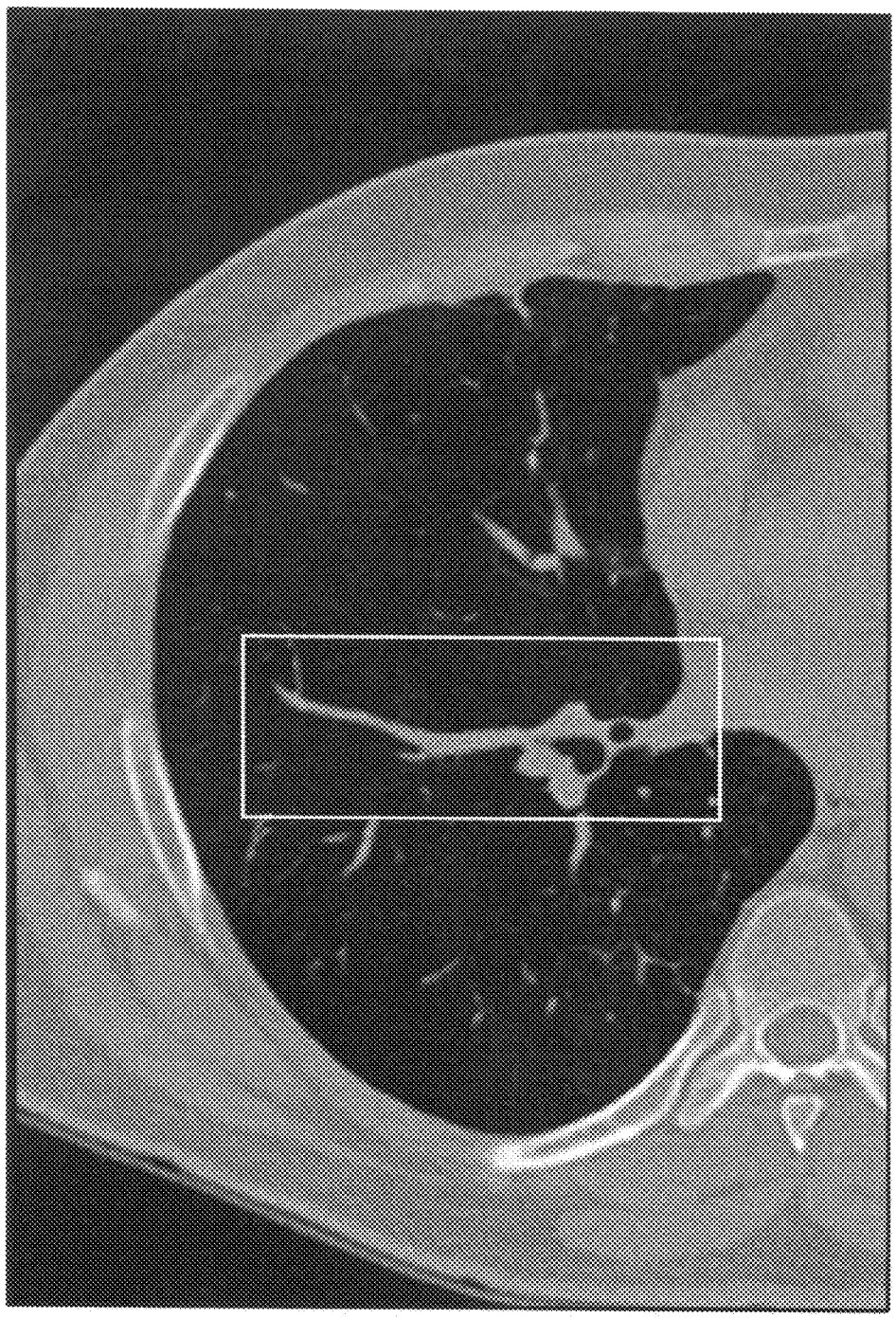
FIGS. 1A-1F are sample slices (e.g., images) showing the mediastinal boundary of a lung, and in particular
Figure 1B:
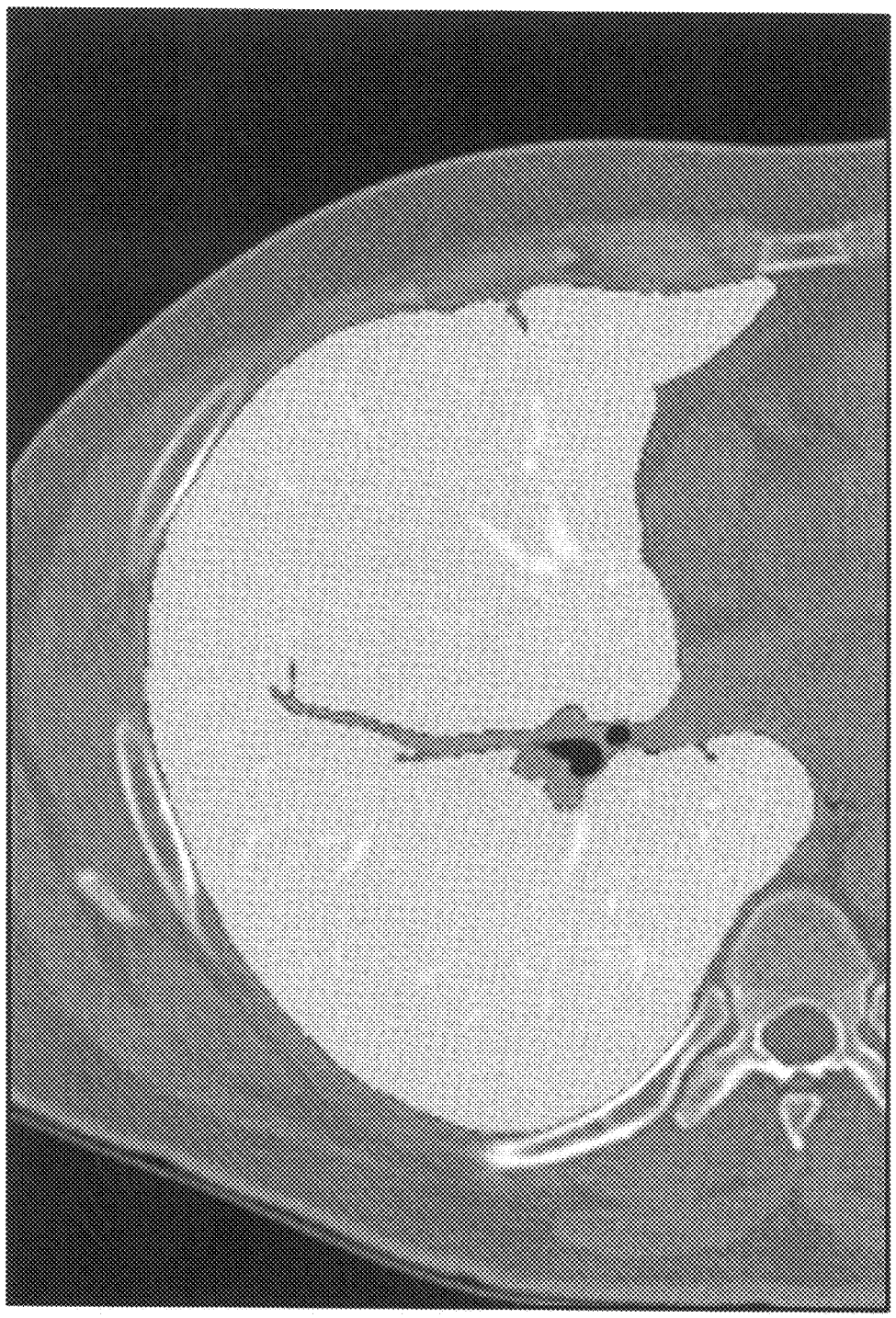
Figure 1C:
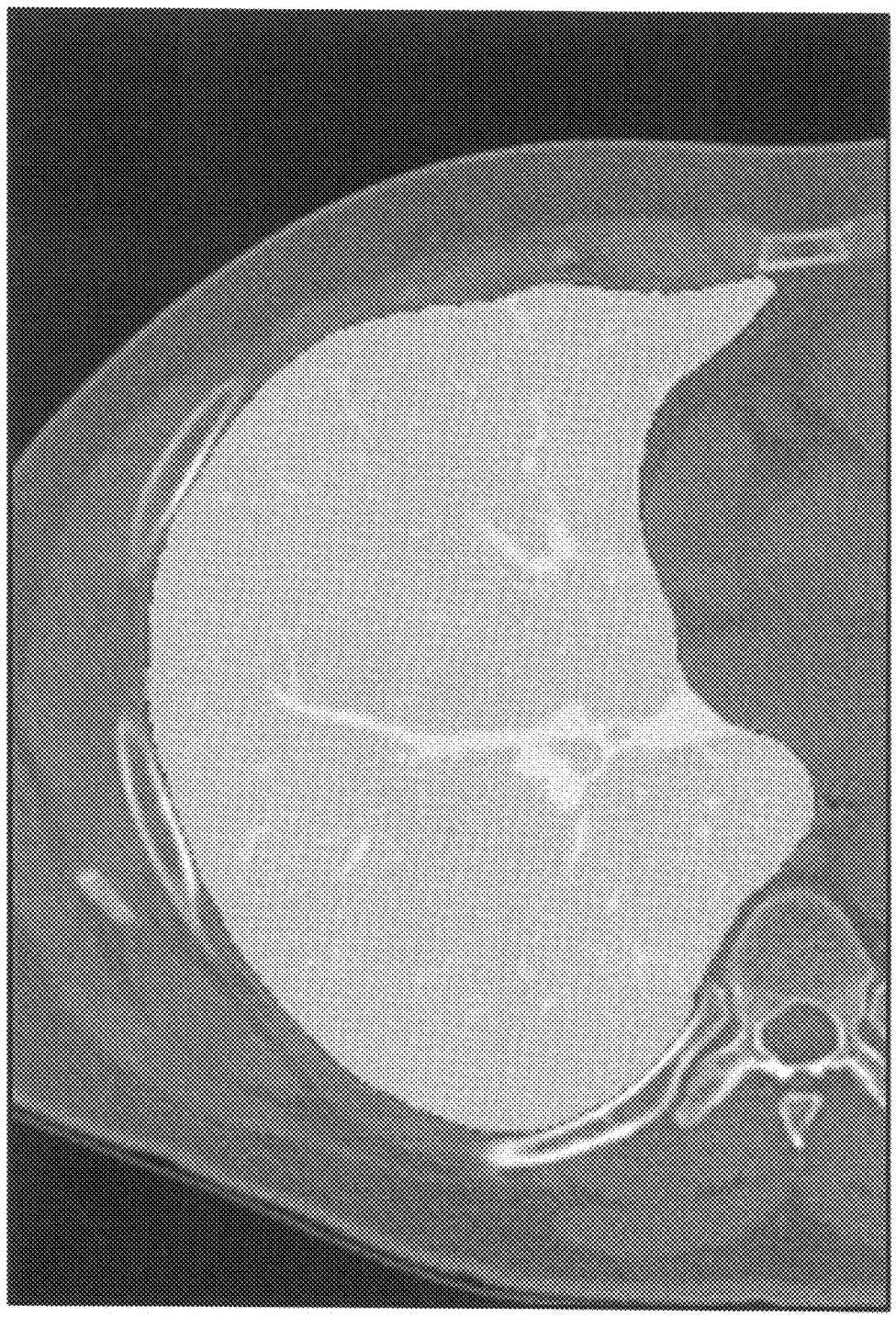
Figure 1D:
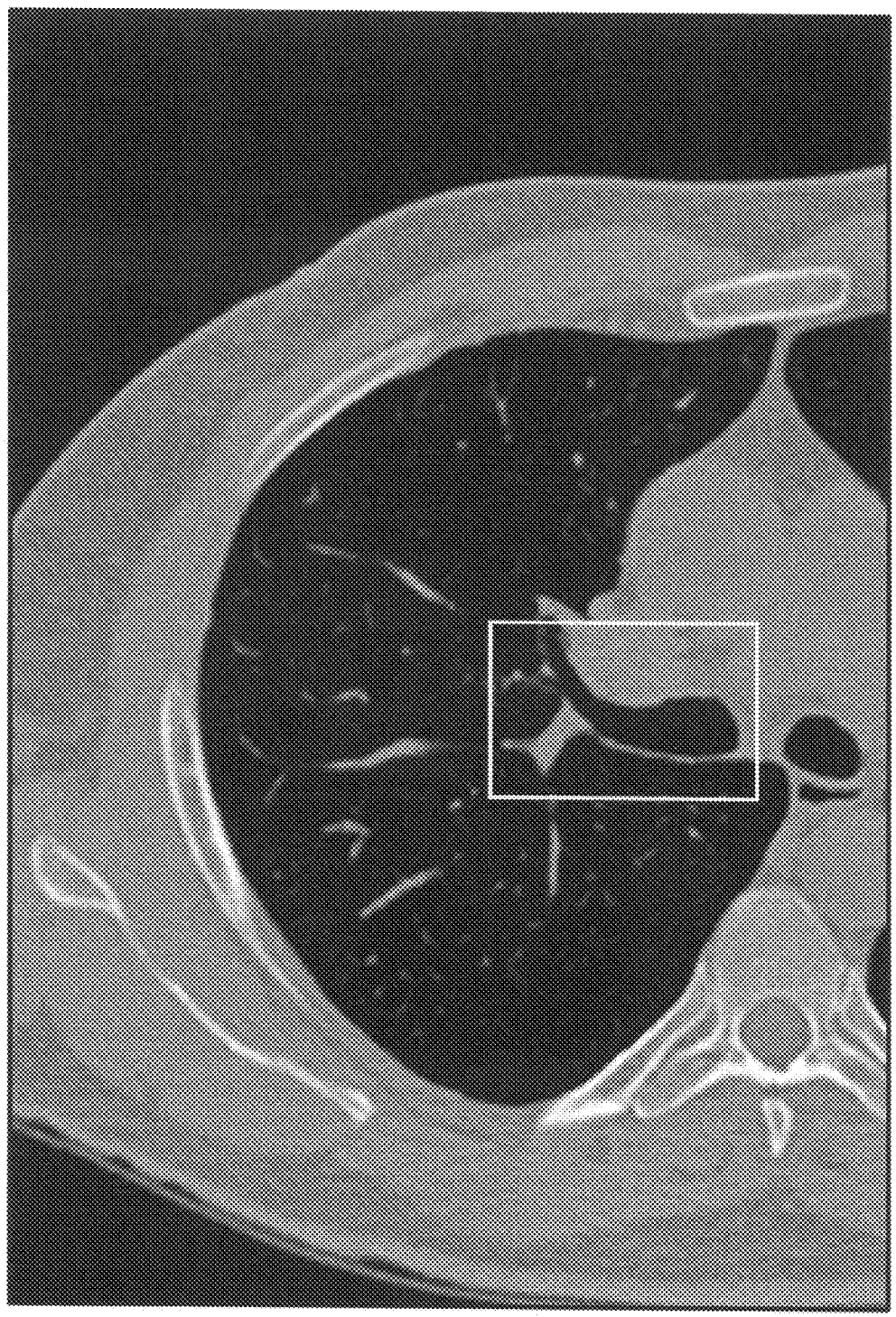
Figure 1E:
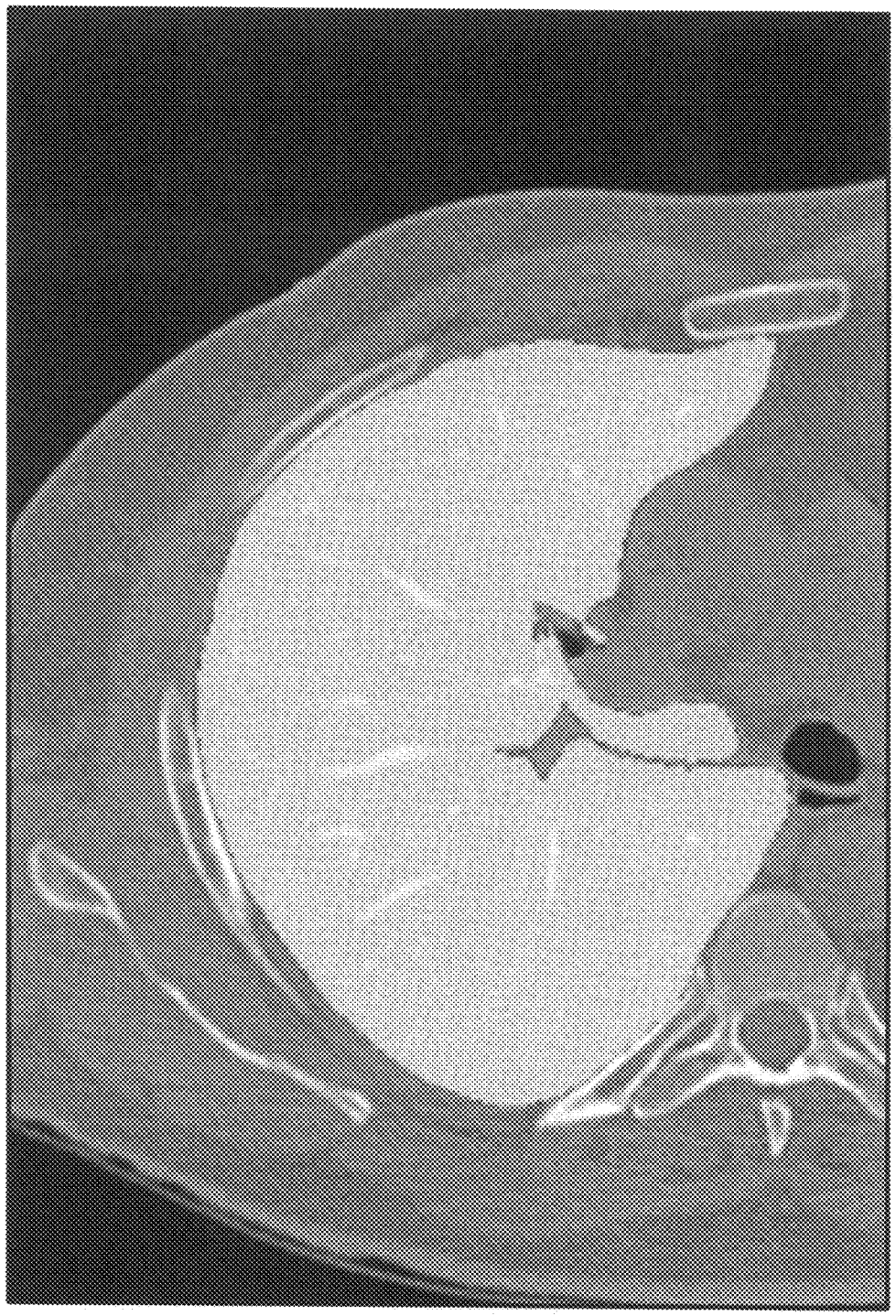
Figure 1F:

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, an automated method "comprising" accessing a volumetric dataset of images containing the segmented lung volume; and performing smoothing operations on lung contours within images contained within a three-dimensional (3-D) bounding structure that encloses the mediastinal boundary of the segmented lung volume, the 3-D bounding structure having a top and a bottom, the 3-D bounding structure including fewer than all of the images in the volumetric dataset is a method that includes at least these recited steps, but is not limited to only possessing these recited steps.

Similarly, a computer readable medium "comprising" machine readable instructions for performing at least the steps of a given method is a computer readable medium that has machine readable instructions for implementing at least the recited steps of the referenced method, but also covers media having machine readable instructions for implementing additional, unrecited steps.

"Using" a structuring element or disc to smooth a lung contour or lung border means that at least a structuring element or disc must be used to achieve the smoothing, but does not exclude the use of other features to achieve the same smoothing.

The terms "a" and "an" are defined as one or more than one, unless this application expressly requires otherwise. The term "another" is defined as at least a second or more.

Descriptions of well known processing techniques, components and equipment are omitted so as not to unnecessarily obscure the present methods and devices in unnecessary detail. The descriptions of the present methods and devices, including those in the appendices of materials that are incorporated by reference, are exemplary and non-limiting. Certain substitutions, modifications, additions and/or rearrangements falling within the scope of the claims, but not explicitly listed in this disclosure, may become apparent to those or ordinary skill in the art based on this disclosure.

One embodiment of the present methods and devices concerns an automated method for the 3-D smoothing of the lung boundary using information from the segmented human airway tree. A segmented airway tree was used in defining a bounding box around the mediastinal boundary of each lung (the portion of the lung that borders the mediastinum), within which all the smoothing operations are performed. All generations of the airway tree distal to the right and left mainstem bronchi were defined or otherwise designated as part of the lungs, and all other segments of the airway tree were defined or otherwise designated as not part of the lungs. A fast morphological closing operation with an ellipsoidal kernel was performed to smooth the surface of the lung.

This method has been tested by processing the segmented lungs from eight normal volumetric datasets of images. The mean value of the magnitude of curvature of the contours of mediastinal transverse slices (e.g., images), averaged over all the datasets, was 0.0450 before smoothing and 0.0167 post smoothing. The accuracy of the lung contours after smoothing was assessed by comparing the automatic results to manually traced smooth lung borders by a human analyst. Averaged over all volumes, the root mean square difference between human and computer borders was 0.8691 millimeters after smoothing, compared to 1.3012 mm before smoothing. The mean similarity index, which is an area overlap measure based on the kappa statistic, was 0.9958 (SD 0.0032), after smoothing.

The volumetric datasets of images that were comprised of eight volumetric pulmonary CT images of normal volunteers. It should be understood, however, that volumetric datasets of images acquired using any suitable imaging modality (e.g., digital acquisition systems such as digital X-ray radiography, magnetic resonance imaging (MRI) and nuclear medicine imaging techniques, such as positron emission tomography (PET) and single photon emission computed tomography (SPECT)) may be used. Digital images can also be created from analog images by, for example, scanning analog images, such as typical X-ray films, into a digitized form.

Images were acquired in vivo using a high-speed multi-slice spiral CT scanner (MX8000, Philips Medical Systems B.V., Best, The Netherlands) with accurate lung volume control, at total lung capacity (TLC), using both B and D reconstruction kernels. Each volumetric dataset contained between 300 and 600 image slices (images) with a slice (image) thickness of 0.5 mm and a reconstruction size of 512×512 pixels. Each voxel represents approximately 0.5×0.5×0.5 mm$^3$.

1.0 Pre-Processing

Figure 2A:
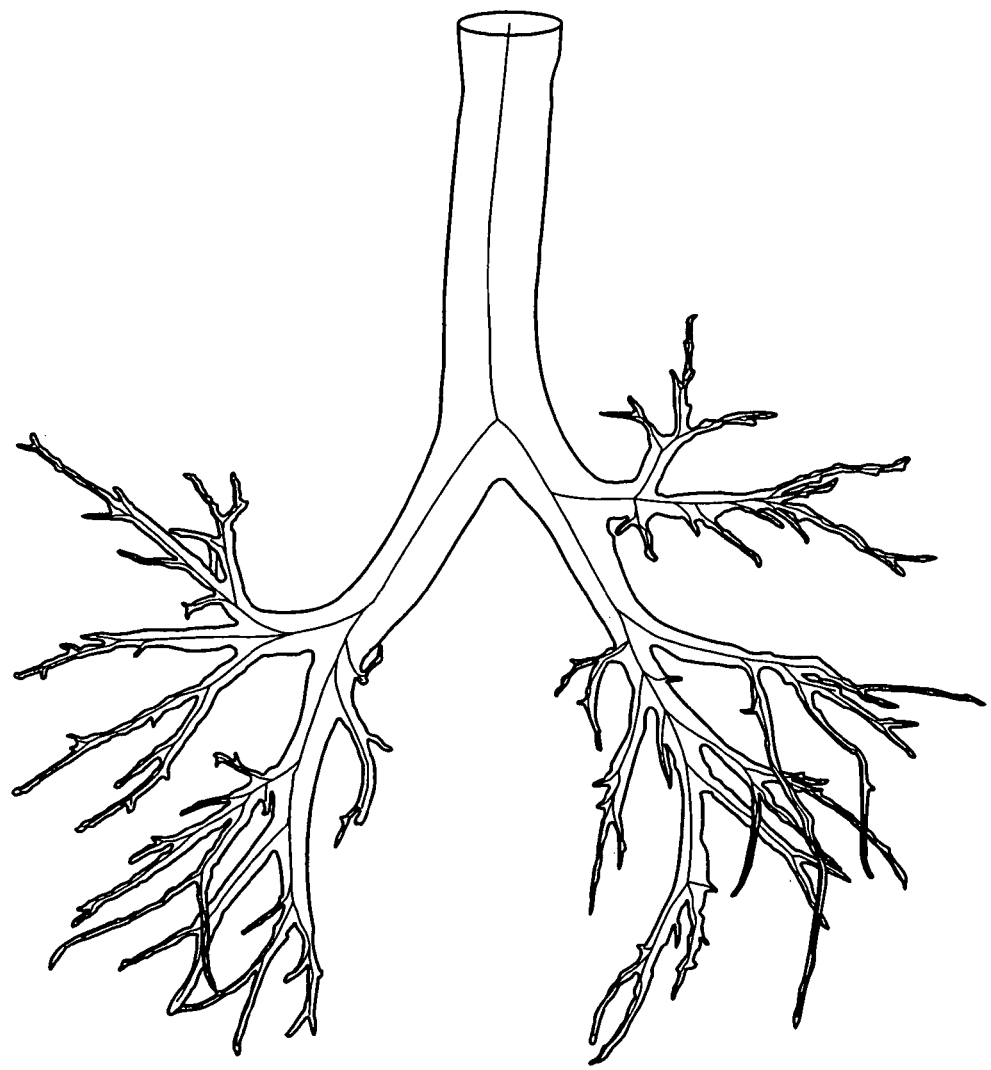
FIG. 2A shows a segmented airway tree with skeleton overlaid, achieved using the method described in appendix 1 of the '184 provisional application.
Figure 2B:
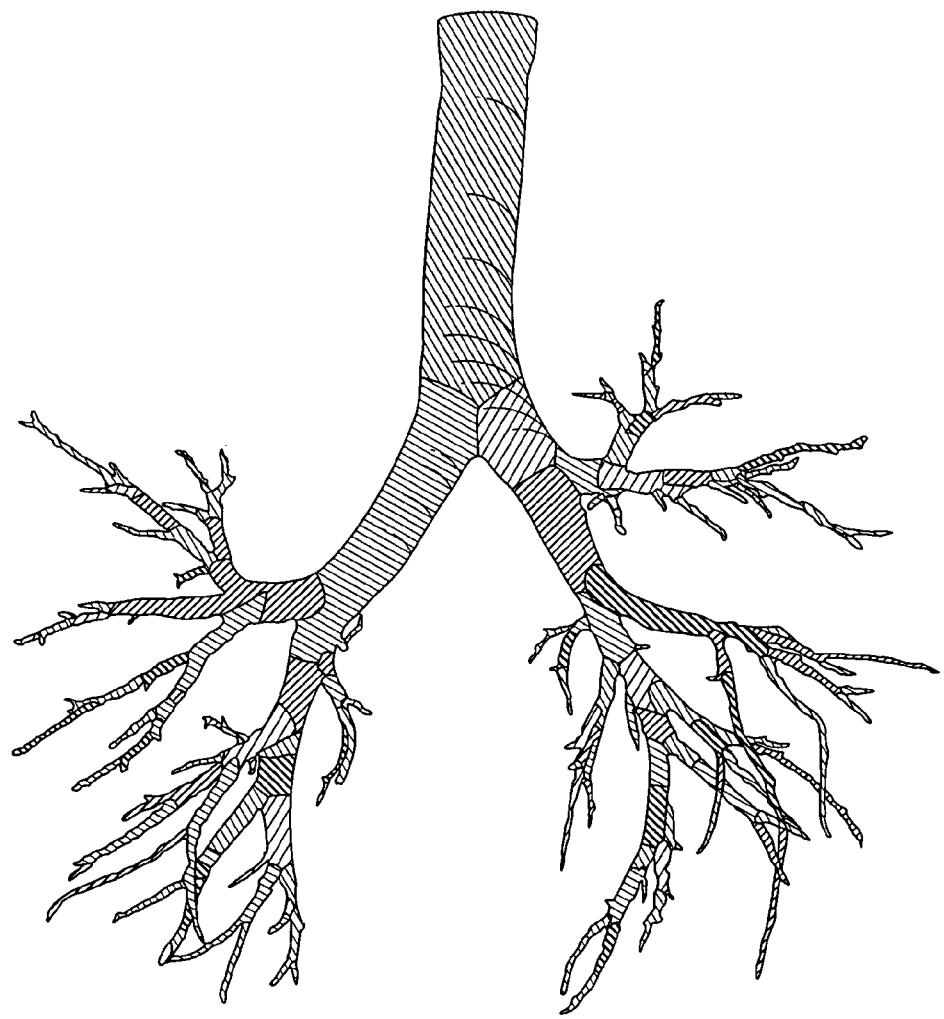
FIG. 2B shows anatomical segment coloring of the segmented airway tree from FIG. 2A.

The segmented lung volumes were segmented using the automated segmentation algorithm described in the '974 application, which description is incorporated by reference, and in appendix 1 of the '184 provisional application, which description is incorporated by reference. That algorithm detects the left and the right lung using pixel intensity and connectivity information. The airway tree was automatically segmented from the images in the volumetric datasets using region growing based on a fuzzy similarity measure between neighboring voxels [5]. The airway skeleton was then extracted from the segmented airway tree using a constrained 3-D thinning algorithm [6]. Next, the airway branching points were extracted from the airway skeleton based on 3-D connectivity [6]. An airway tree definition with segments labeled according to generation was then constructed from the above, using the method from [5]. FIG. 2A shows a segmented airway tree with an overlaid skeleton, and FIG. 2B shows a segmented airway tree with anatomical segment coloring.

2.0 Criteria for Including Airway Tree Segments within Segmented Lung Volume

One major cause of the lack of smoothness in the segmented lung borders near the mediastinum is that there is no consistent criteria for the inclusion of airway tree segments inside the lung. If a threshold-based segmentation is used, then on some transverse slices the largest segments, such as the trachea and left and right main bronchi, may be included, while on adjacent slices they might be missing. The following series of operations were performed to rectify this.

Figure 3A:
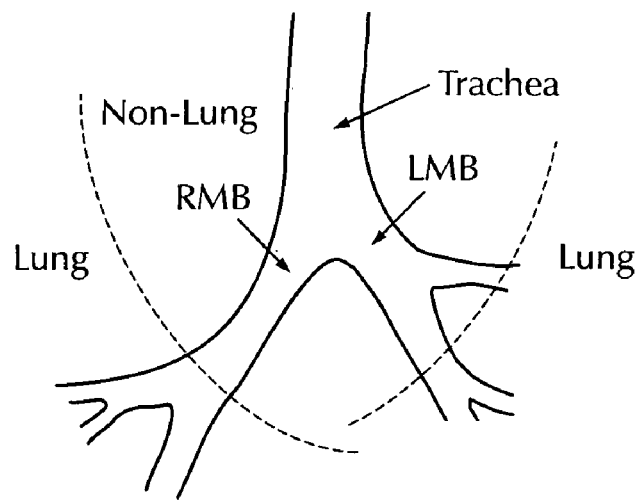
FIG. 3A shows criteria for including airway segments within a lung volume of interest.

Let A denote the segmented airway lumen and let L denote the initially segmented lungs. We kept all anatomical segments distal to the trachea and the right and left main bronchi as part of the lung (see FIG. 3A), i.e., the regions remaining after excluding $A_1 = A_{trachea} \cup A_{RMB} \cup A_{LMB}$, where RMB stands for right main bronchus and LMB stands for left main bronchus. Because $A_1$ corresponds only to the segmented airway lumen, we dilated it with $B_4$ (a 4-connected approximation to a unit disk) to account for the airway wall thickness and obtained $A_2 = A_1 \oplus B_4$. We then removed the voxels defined by $A_2$ from the segmented lungs L, to obtain $L_1$. This sequence can be represented as follows:

$$A_1 = A_{trachea} \cup A_{RMB} \cup A_{LMB},$$

$$A_2 = A_1 \oplus B_4,$$

$$L_1 = L \setminus A_2.$$

Figure 3B:
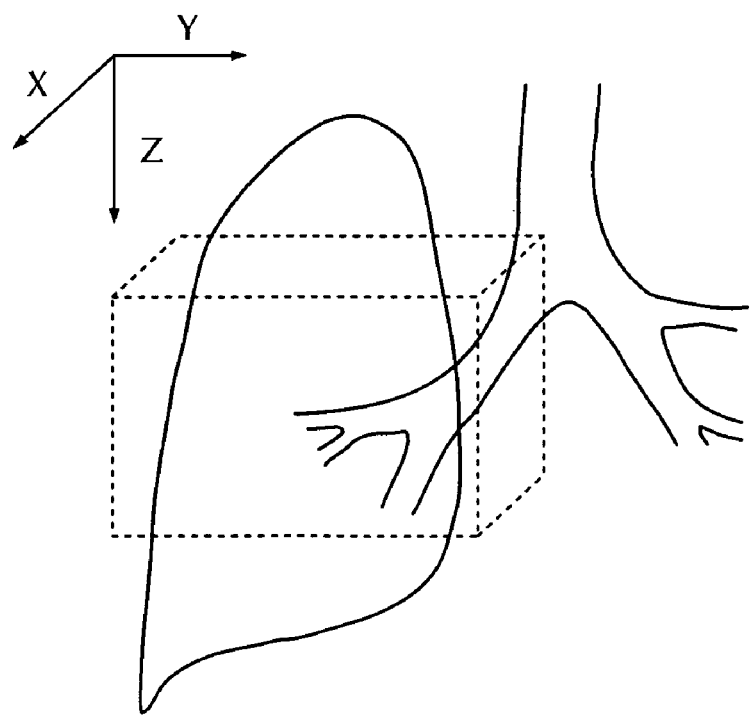
FIG. 3B generically depicts an exemplary 3-D bounding structure (e.g., bounding box) in which smoothing operations may be performed.

3.0 3-D Bounding Structure Around the Mediastinal Boundary of the Segmented Lung Volume for Localization of Smoothing A purpose of our smoothing algorithm is to define consistent, smooth borders for segmented lungs near the mediastinum. Hence we have, in our preferred embodiment, localized our smoothing operations to the region around the mediastinum, so that the contour of the lung at regions away from the mediastinum are not affected (see FIG. 3B). Another benefit to our approach of localizing our smoothing operations is the reduction in computational time.

We smoothed the right and left lungs separately (although it may be possible to smooth them together in other embodiments) because the left and right lung are separated by very thin anterior and posterior junctions, which have very weak contrast on the cross-sectional images. Gray-scale thresholding often fails to separate the left and right lungs, and usually a more sophisticated method like dynamic programming has to be used to separate the two lungs on a given slice, leading to a separating line which is only a few voxels wide [1], [2]. Therefore, we chose to perform our morphological operations separately on each lung to avoid joining the two lung regions.

After removing the trachea and the right and left mainstem bronchi from the segmented airway tree, we were left with two airway tree components corresponding to the two lungs. To define our 3-D bounding structure (which in our preferred embodiment is a rectangular box; see FIG. 3B for a generic representation) in the Z dimension we used the following method. To find the top of the 3-D bounding structure, we started with the apical-most image within a given volumetric dataset of images and searched the images moving in the basal direction for the first image on which an airway segment lies outside the segmented lung volume. Stated another way, the 3-D bounding structure is defined at the top by the apical-most image in the volumetric dataset that contained an airway segment lying outside the lung contour of the portion of the segmented lung volume depicted in that apical-most image.

Figure 4A:
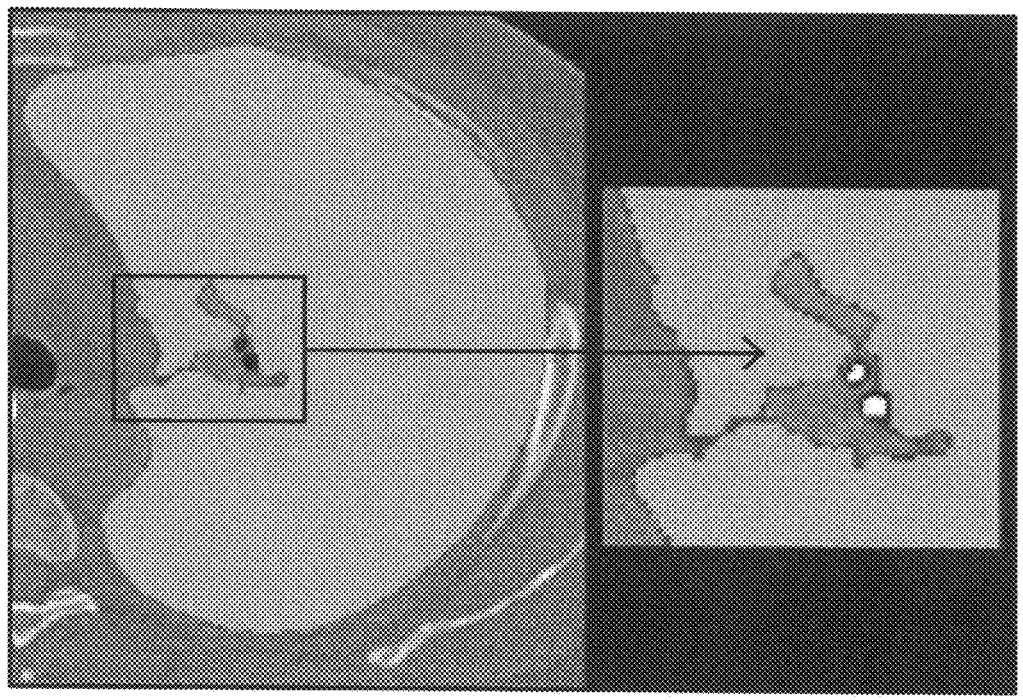
FIG. 4A shows the apical-most image in a volumetric dataset in which airways are highlighted in white, the apical-most image defining the top of a 3-D bounding structure.
Figure 4B:
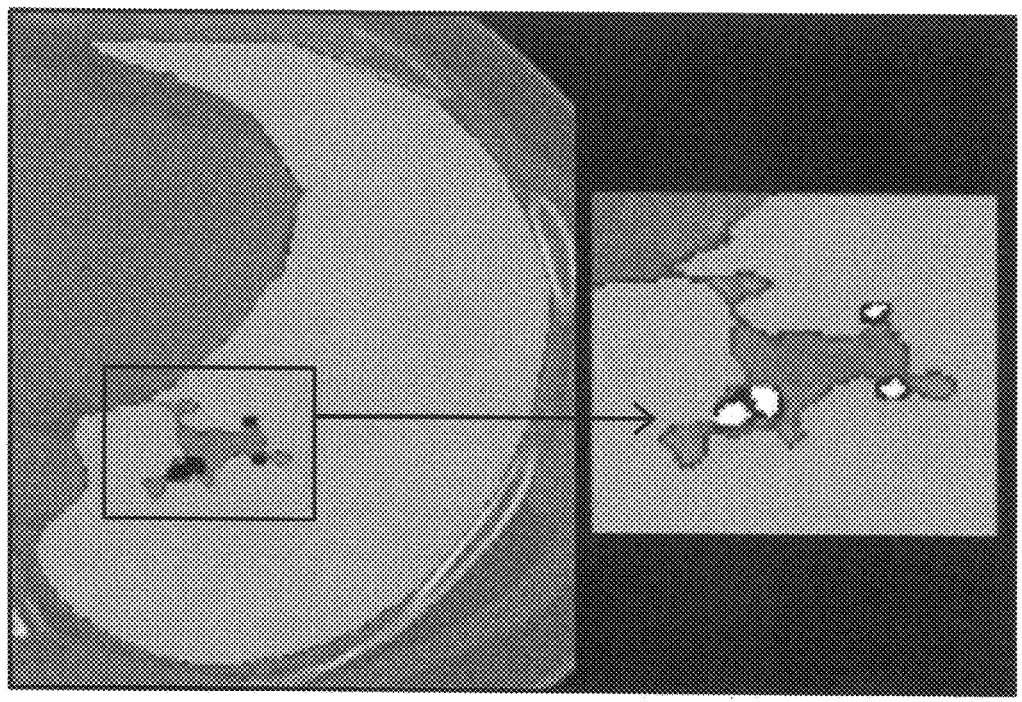
FIG. 4B shows the basal-most image in a volumetric dataset in which airways are highlighted in white, the basal-most image defining the bottom of a 3-D bounding structure.

We conducted a similar search in the apical direction starting with the basal-most image from the same volumetric dataset of images to find the bottom of the 3-D bounding structure. Sample images at the top and bottom of the bounding box are shown in FIGS. 4A and 4B, respectively.

This approach to defining the Z dimension of our 3-D bounding structure is a reliable way of defining the relevant region of unsmoothness in the mediastinal boundary of the segmented lung volume, mainly because the airway and vascular tree branches follow each other very closely and therefore the lung boundary indentations caused by blood vessels are indicated by the presence of airway tree segments.

The X and Y dimensions of the 3-D bounding structure were determined by simply calculating the minimum and maximum extent of the lung regions in the X and Y directions across all Z slices selected as specified in the preceding paragraph.

4.0 Smoothing Operations

After merging the airway branch regions (other than the left main and right main bronchi) to the lung regions, and defining the 3-D bounding structure for our smoothing operations, we began our smoothing operations on the contours of the segmented lung volume within the 3-D bounding structure. For a portion (e.g., most) of the segmented lung volume, we used a morphological closing operation with a 3-D structuring element because we wanted the contours of the lung to be smooth in 3-D. Any suitably shaped 3-D structuring element may be used, such as a sphere or an ellipsoid. We used an ellipsoid, taking into consideration that the 3-D structuring element should be big enough to fill in the indentations in the mediastinal boundary of the segmented lung volume smoothly, and that making the 3-D structuring element too large might cause the smoothed boundary to move too far away from the true lung boundary.

We discovered that an ellipsoid having X and Y dimensions of 1.8 centimeters and a Z dimension of 0.9 cm provided a suitable trade-off between the above considerations. The radius is larger in the transverse (XY) plane to account for the larger boundary indentations in the transverse plane. The Z dimension of the 3-D structuring element provided for a smooth change in the contour from one transverse slice to another, giving a smooth surface in 3-D.

Figure 5:
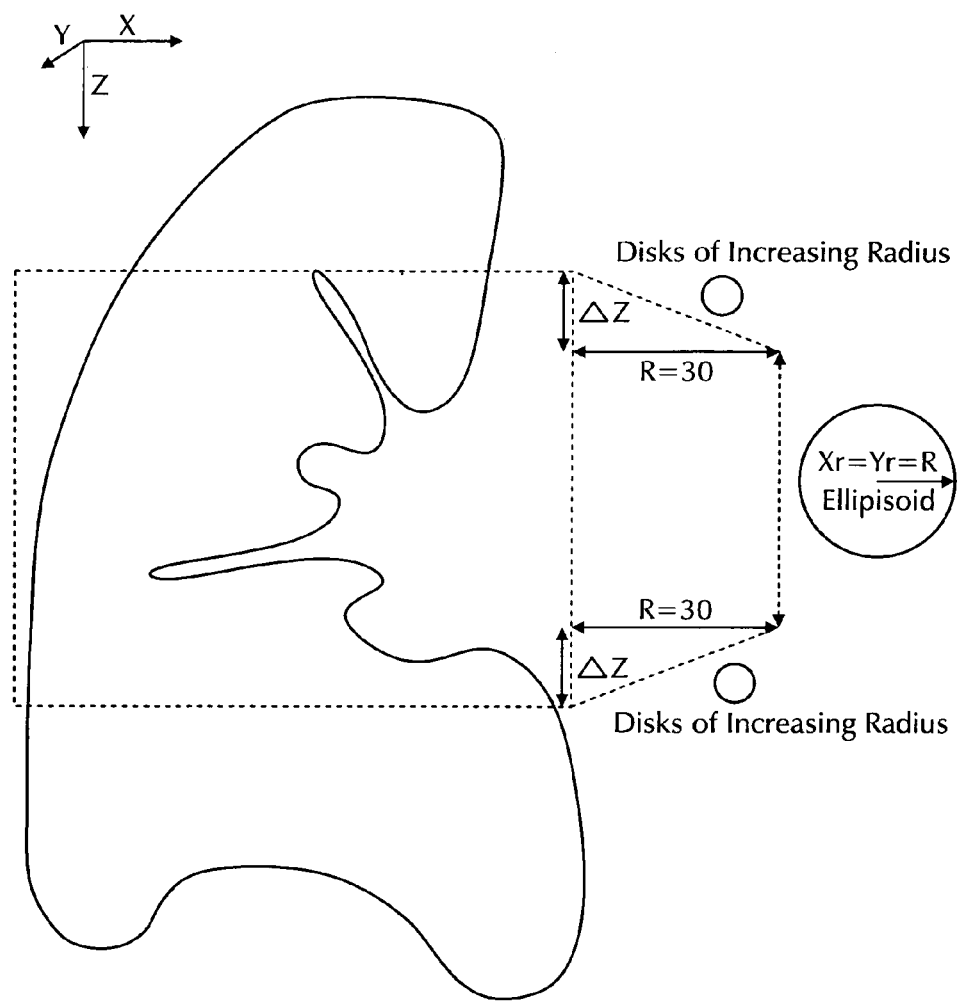
FIG. 5 illustrates the different regions within a 3-D bounding structure in which smoothing operations were performed, including top and bottom transition regions containing images to which discs of increasing size were applied for smoothing.
Figure 6A:
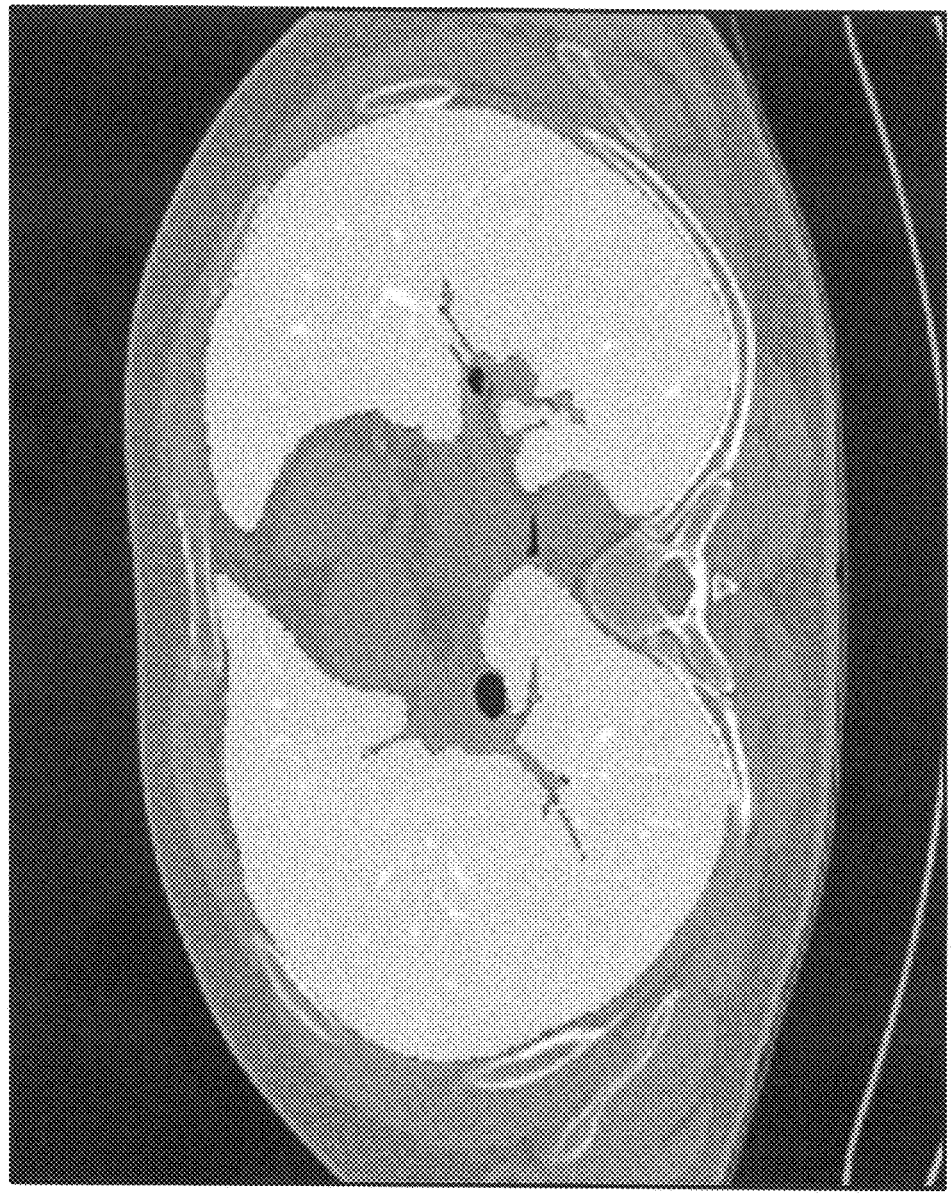
FIGS. 6A-6C are sample transverse, coronal and sagital slices (e.g., images), respectively, before smoothing.
Figure 6B:
Figure 6C:
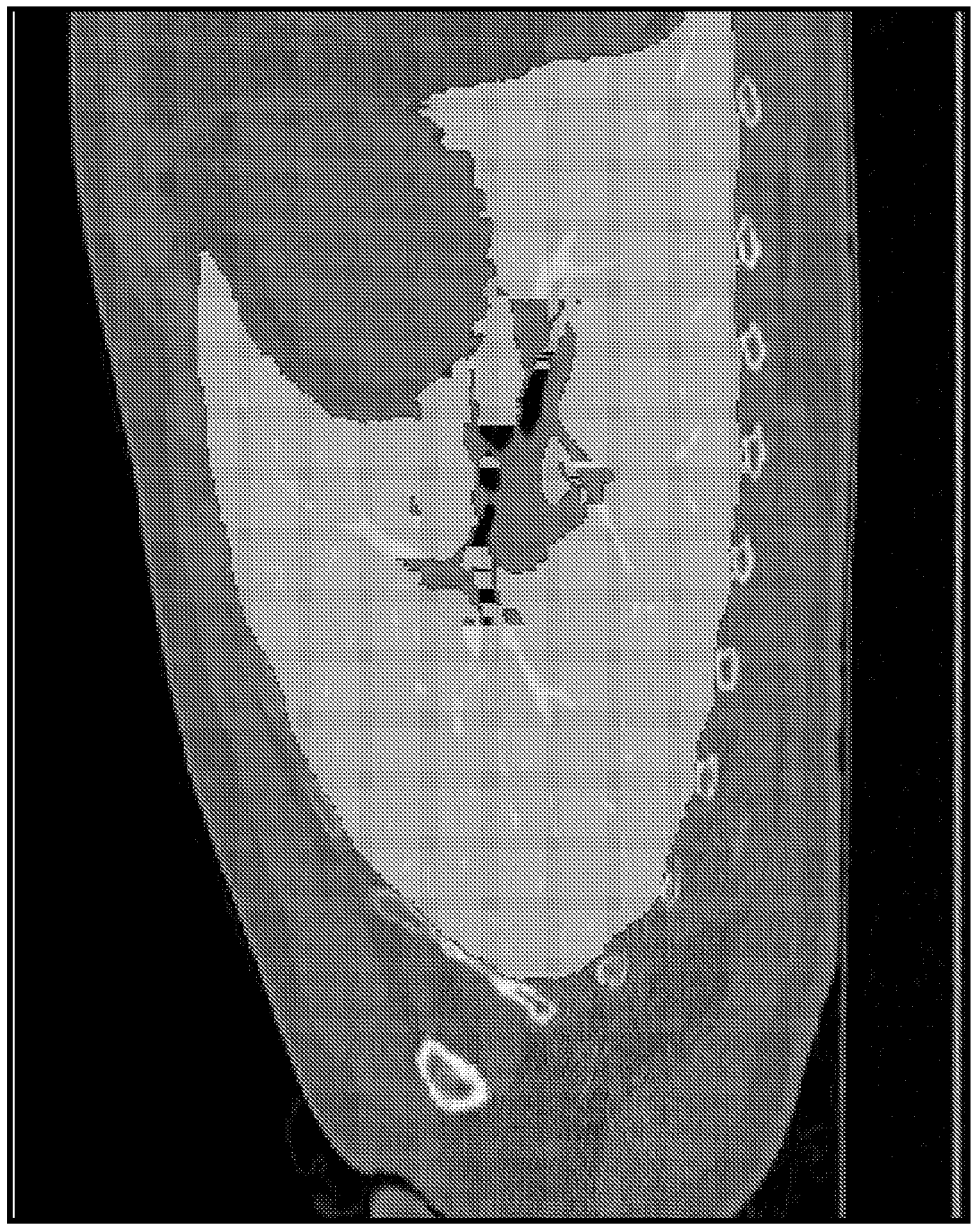
Figure 6D:
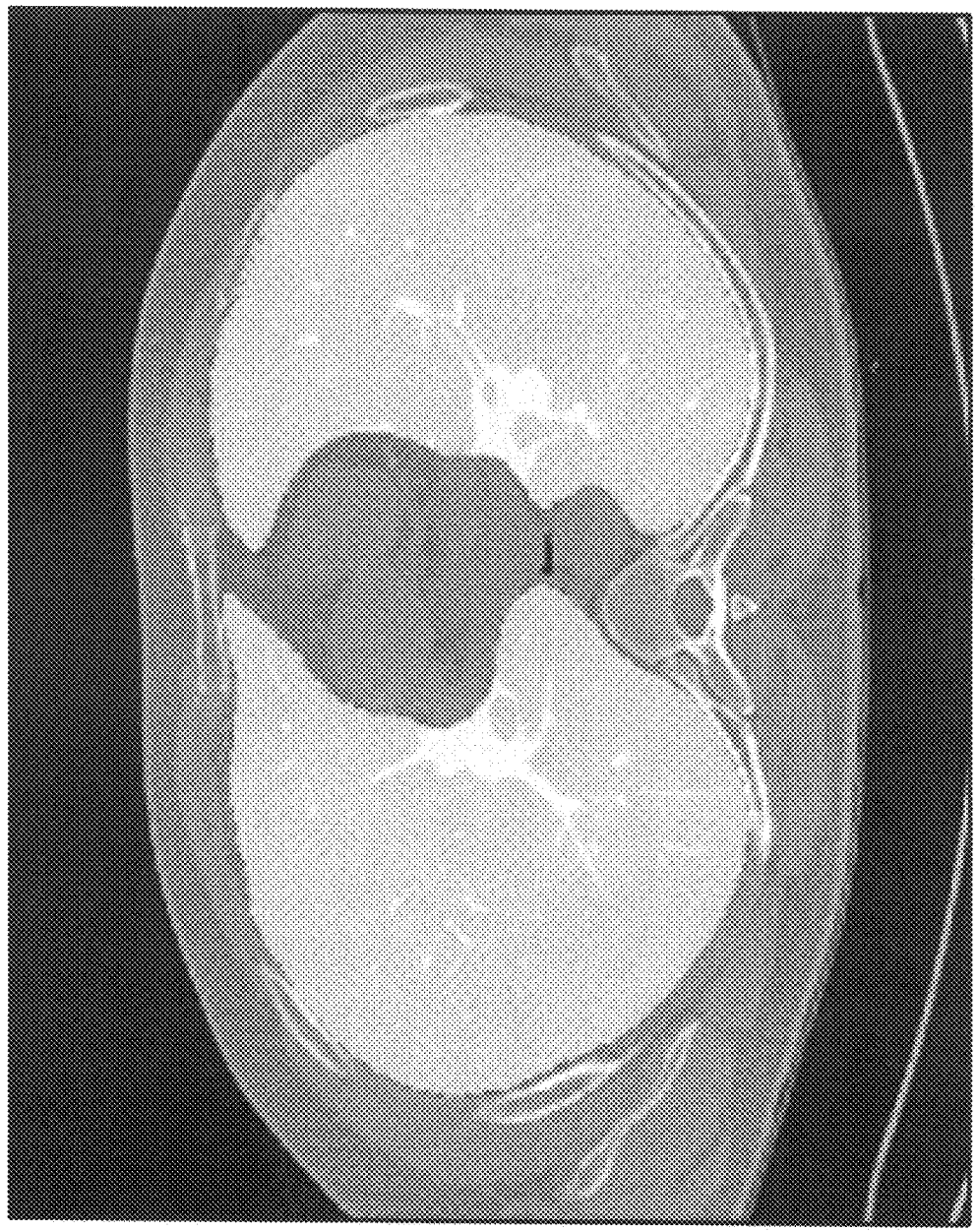
FIGS. 6D-6F are the same transverse, coronal and sagital slices, respectively, after smoothing.
Figure 6E:
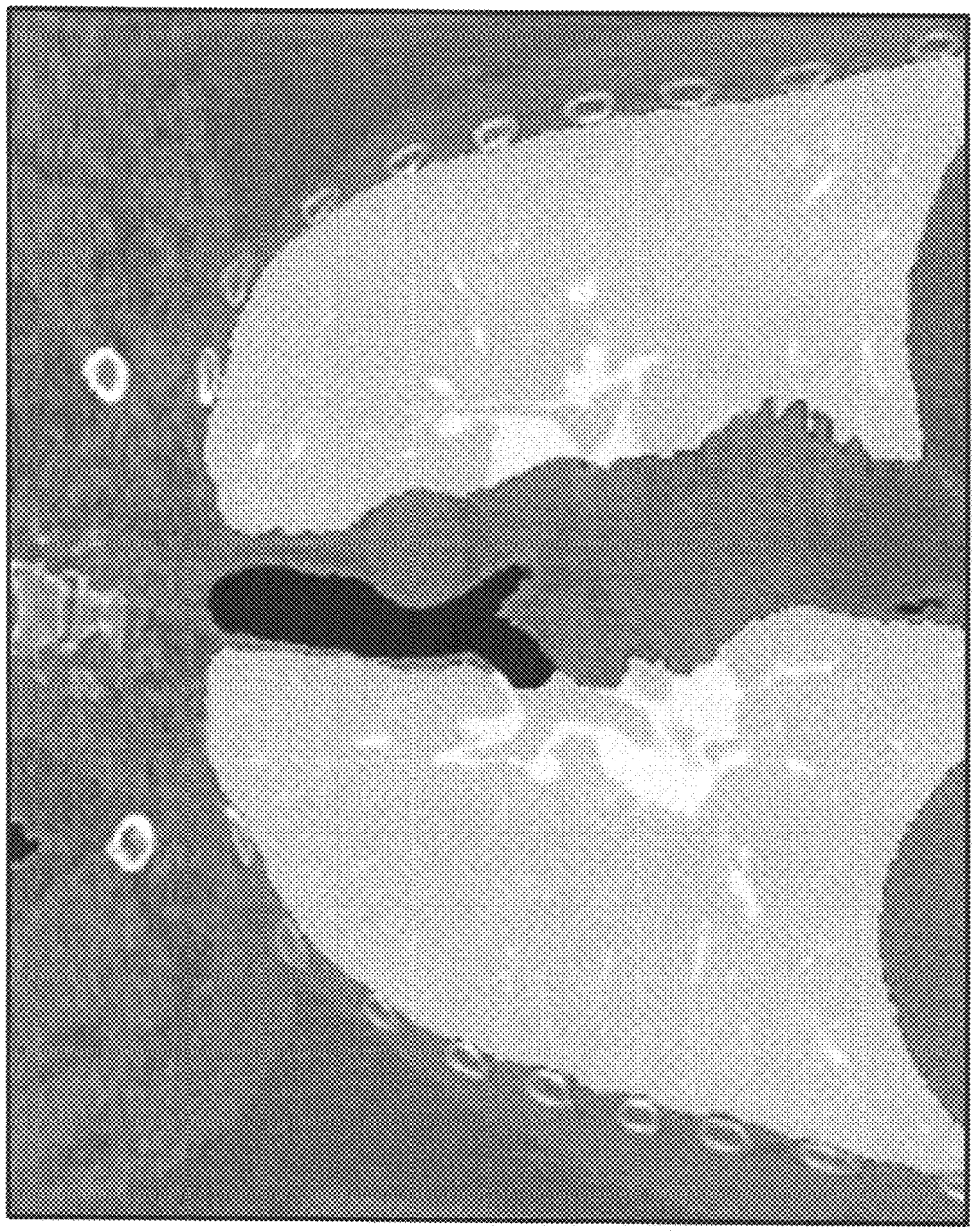
Figure 6F:
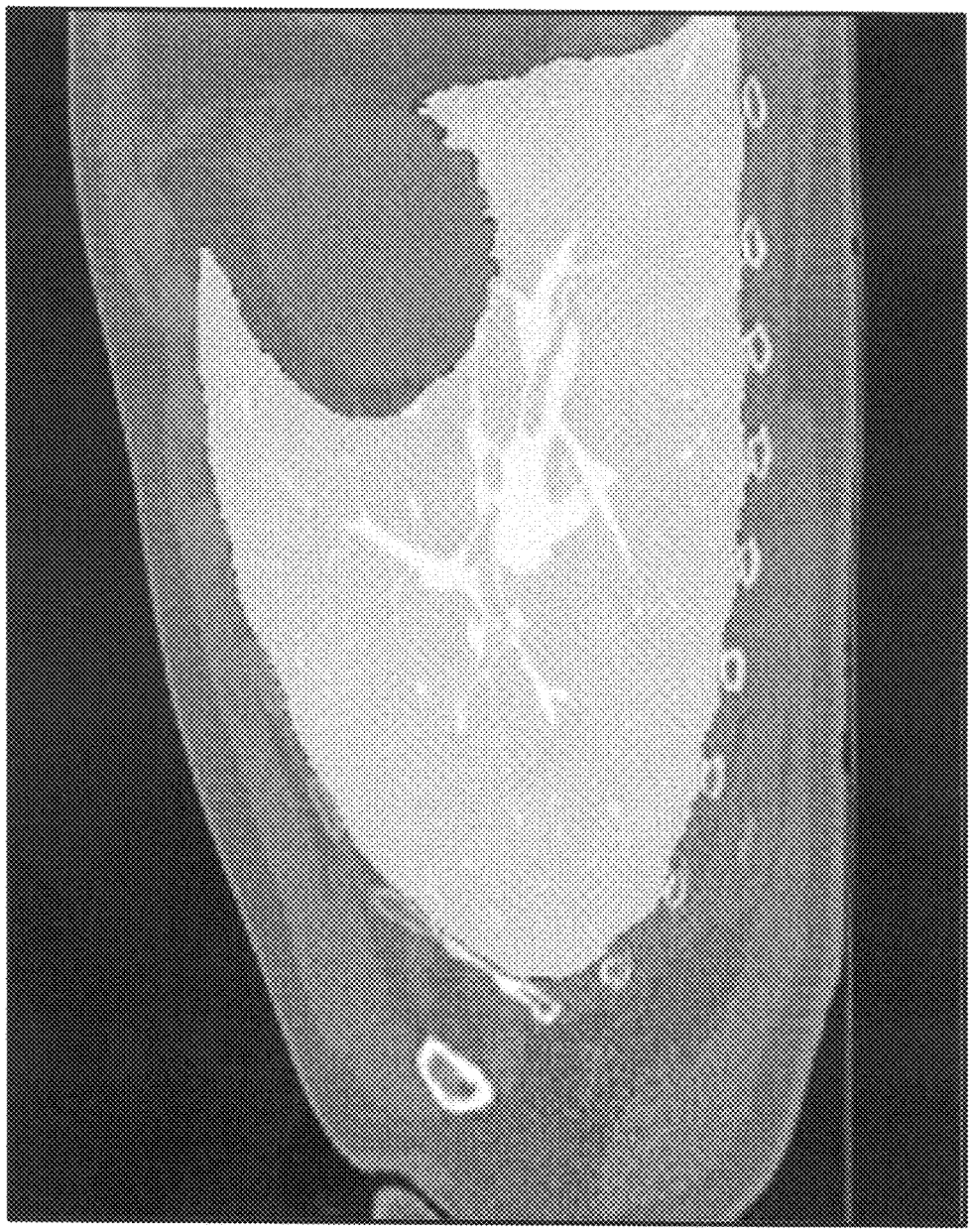

As illustrated in FIG. 5, we performed a morphological closing with our structuring element SE on a portion of the segmented lung volume $L_1$ located in the 3-D bounding structure to get $L_1$, and we used discs of increasing size (which may be characterized as structuring elements) to smooth lung contours in certain images near the top and bottom of the 3-D bounding structure. The images near the top of the 3-D bounding structure may be characterized as a top set of images, and the images near the bottom of the 3-D bounding structure may be characterized as a bottom set of images. The top set of images may be characterized as defining a top, or apical, transition region, and the bottom set of images may be characterized as defining a bottom, or basal, transition region. Within each transition region, we adjusted the disk radius from 0 pixels (which may have a size of 0.5 millimeters) at the apical-most image (if starting from the top) or the basal-most image (if starting from the bottom) to 30 pixels at the basal-most image (if starting from the top) or the apical-most image (if starting from the bottom). The radius of the discs increased linearly, although a non-linear increase or any other manner of increase could be used if better suited to a given application.

As scanning technology, and therefore image resolution, improves, the size of the discs that are used may change so that physical structures of the same size are appropriately smoothed. For example, we used pixels with a size of 0.5 mm, and a largest disc having a radius of 30 pixels. If imaging technology changes so that the pixels are 0.25 mm in size, the largest disc would probably be adjusted to have a radius of 60 pixels to achieve the same effect we achieved.

Assuming that $Z_{start}$ and $Z_{end}$ are the apical and basal most slices of the 3-D bounding structure, the structuring element sizes can be represented as follows:

$$R_z = \begin{array}{l} \frac{Z - Z_{start}}{\Delta Z} \times R, \; Z_{start} \leq Z \geq Z_{start} + \Delta Z \\ \frac{Z_{end}}{\Delta Z} - \times R, \; Z_{end} - \Delta Z \leq Z \geq Z_{end} \end{array}$$

where $R_z$ is the radius of a given disc and can be expressed in pixels, Z is the current slice (image) number or position and can be expressed in mm, and $\Delta Z$ is the distance between slices (images) and can be expressed in mm.

The closing operation described above may be characterized as yielding an initial smoothed lung volume, and may change the lung boundary at places away from the mediastinum (and, thus, away from the mediastinal boundary of the segmented lung volume). We, therefore, examined the regions added by the closing and discarded those that are away from the mediastinum. We computed the difference between the smoothed lung regions and the original lung regions $L_3 = L_2 \setminus L_1$ (where $L_3$ may be characterized as a first intermediate smoothed lung volume), and did 3-D connected component analysis on $L_3$ (and, more specifically, on images within the 3-D bounding structure), where the connected components analysis returned labeled, 3-D connected components (regions; more specifically, volumetric regions) $R_1$, $R_2, R_3, \ldots R_N$. To determine which regions to retain, we used the criteria that region segments that overlap with the airway tree (that is, the previously-segmented airway tree) are near the mediastinum. We let $R_i$ represent the set of voxels belonging to a given region, and kept $R_i$ if $R_i \cap A$ (where A denotes the segmented airway lumen) is non-empty, else we discarded the region. The retained regions were then added back to the original segmented lung volume L to get the smoothed segmented lung volume $L_{smooth}$, which may also be referred to as a final smoothed lung volume. The sequence of steps we used to achieve our smoothing can be represented as follows:

$$L_2 = L_1 \oplus SE$$
$$L_3 = L_2 / L_1$$
$$L_4 = Conncompo(L_3),$$
$$= R_1 \cup R_2 \cup R_3 \ldots R_N,$$
$$L_5 = \{p \in R_i : R_i \cap A \neq 0\},$$
$$L_{smooth} = L_1 \cup L_5,$$

where Conncomp(.) processes an image and returns labeled, 3-D connected components $R_1, R_2, R_3, \ldots R_N$.

5.0 Comparison with Manual Analysis

Figure 7A:
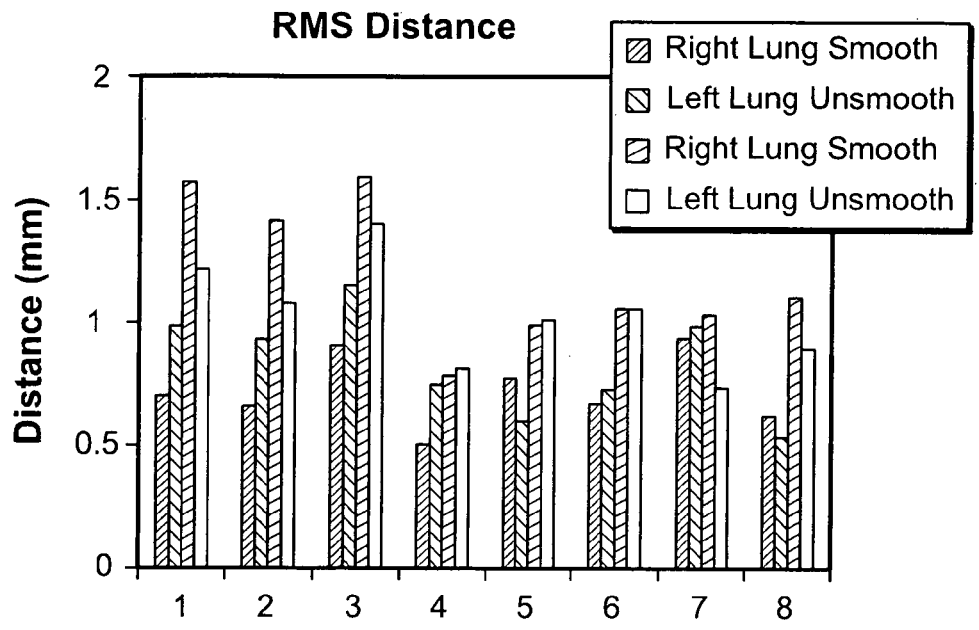
FIG. 7A depicts the RMS distance averaged over transverse slices within the 3-D bounding structure for each of the 8 volumetric datasets used, thus comparing an embodiment of the present automated method of smoothing to manual tracing.
Figure 7B:
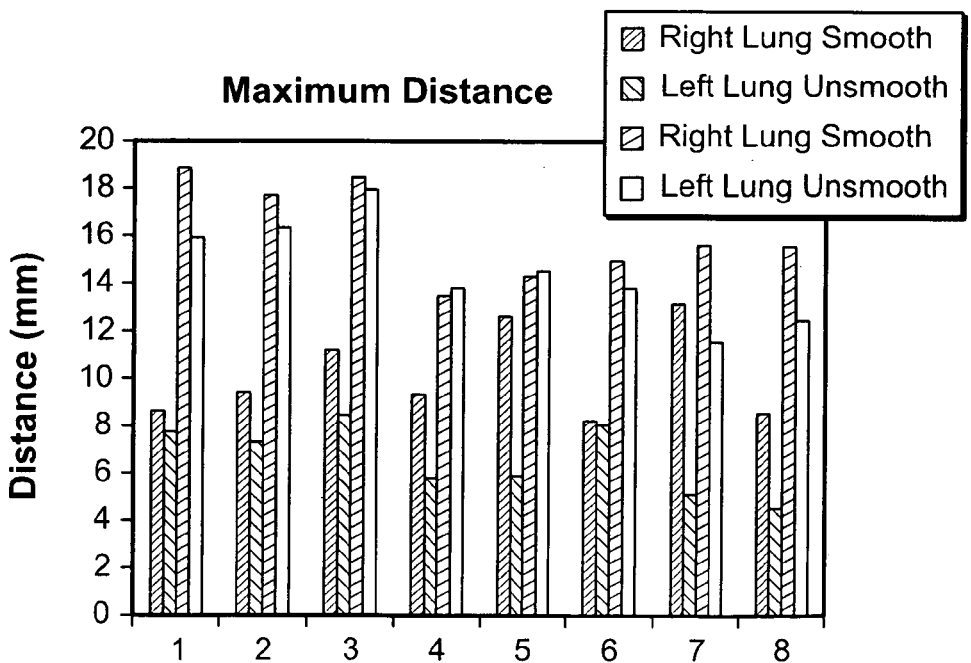
FIG. 7B depicts the maximum distance between the manually traced lung boundary created through manual tracing and the lung boundary achieved with an embodiment of the present automated methods, and between the manually traced lung boundary and the unsmoothed lung boundary.
Figure 7C:
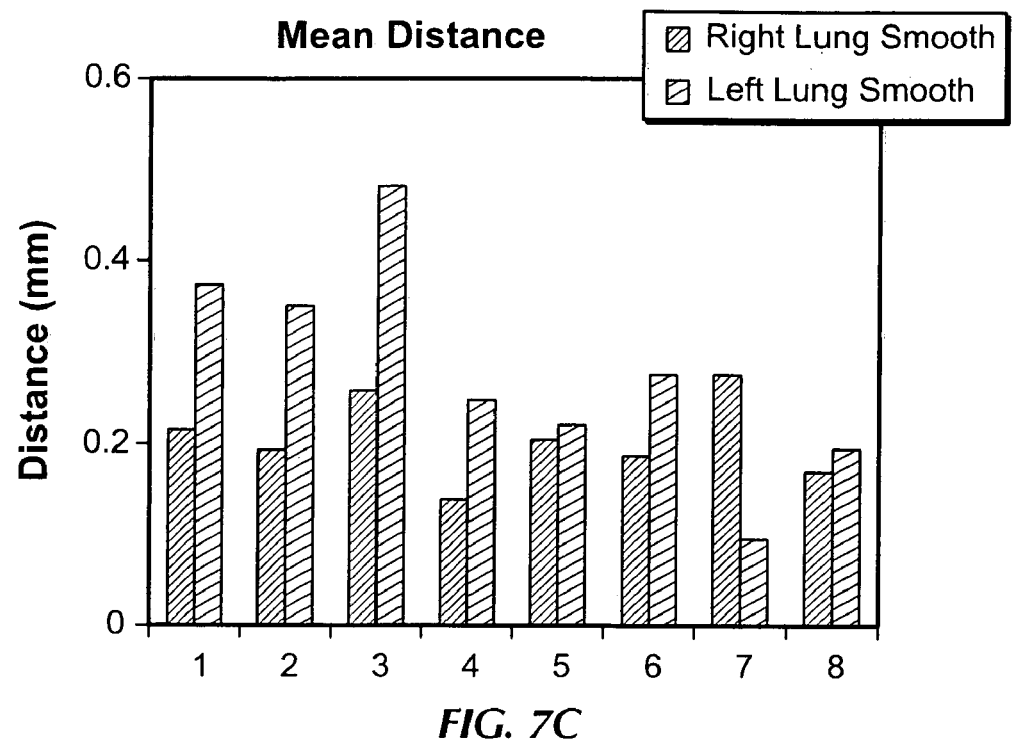
FIG. 7C depicts the mean distance averaged over all transverse slices within the 3-D bounding structure for each of the 8 volumetric datasets used, thus comparing an embodiment of the present automated method of smoothing to manual tracing.
Figure 7D:
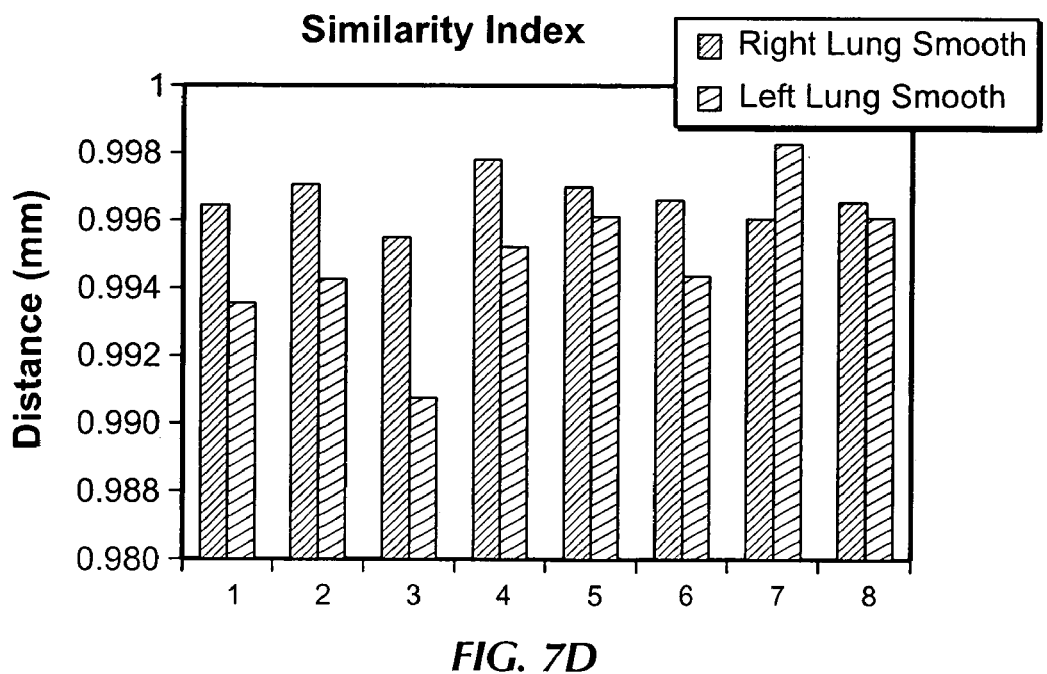
FIG. 7D depicts the similarity index (area overlap index) averaged over all transverse slices within the 3-D bounding structure for each of the 8 volumetric datasets used, thus comparing an embodiment of the present automated method of smoothing to manual tracing.

The accuracy of lung contours after smoothing was assessed by comparing the automatic computer-based segmentation and smoothing with results obtained by manual analysis. An image analyst manually traced the left and right lung borders on every third slice near the mediastinum for each of the 8 volumetric datasets. Two different criteria were used for comparing automatic results with manual tracing: (1) the area overlap criteria based on the intersection region between the two results; and (2) a distance measure between contour pixels. The area overlap index κ was computed as:

$$\kappa = 2 \times \left( \frac{|A_{manual} \cap A_{automatic}|}{|A_{manual}| + |A_{automatic}|} \right),$$

where $A_{manual}$ and $A_{automatic}$ represent manually traced and automatically-detected regions, respectively, and || represents the area of a region. The area overlap index κ is derived from the kappa coefficient calculation, which is used in reliability studies, and has been used in the area of image segmentation to measure the agreement between different classifications [7]. We computed κ for all transverse slices on which a manual segmentation was performed. The results are shown in FIG. 7C for each of the 8 volumetric datasets.

Border positioning accuracy (the accuracy with which the automated segmentation and smoothing algorithm positioned the lung borders, or boundaries, of the segmented lung volume) was assessed by computing the mean, RMS, and maximum distance between the manually-defined borders and the automatically (e.g., computer) defined borders. For each pixel on the manually-defined borders, the minimum distance d to the computed-defined border was computed as $$d_i = \min_j \left\{ \sqrt{(x_i^M - x_j^A)^2 + (y_i^M - y_j^A)^2} \right\},$$

where $(x_i^M, y_i^M)$ is the manually-defined border pixel location and $(x_j^A, y_j^A)$ is a computer-defined border pixel location [8].

For each manually-defined border pixel, the mean, RMS, and maximum distance to the computer-defined border were computed using the following equations:

$$d_{mean} = \left( \sum_{i=1}^{l} |d_i| \right) / l,$$

$$d_{RMS} = \sqrt{\sum_{i=1}^{l} d_i^2 / l},$$

$$d_{max} = \max_i |d_i|,$$

where l is the number of points on the manually-defined borders. The results are shown in FIGS. 7A, 7B and 7C for each of the 8 volumetric datasets. The RMS and maximum values are also given between manually-traced borders and unsmoothed borders, to show a clear distinction in the observed values.

It can be noted from the RMS and mean distance values that for most of the datasets the left lung shows a higher value. This is mainly because of the effect of the motion of the heart, which is more pronounced for the left lung and which causes the lung boundary to move significantly from slice to slice. This motion artifact is removed during the automatic smoothing, which essentially constitutes a 3-D smoothing operation, but this type of smoothing is difficult for a manual observer to perform when tracing slice by slice. The maximum errors consistently show a higher value for the right lung and it occurs mostly on or near slices where the main bronchi branch out and merge into the lung. This can be attributed to the difference in the inclusion of airways in the two results, and also due to the lack of use of 3-D information when manually tracing slice by slice.

Figure 8A:
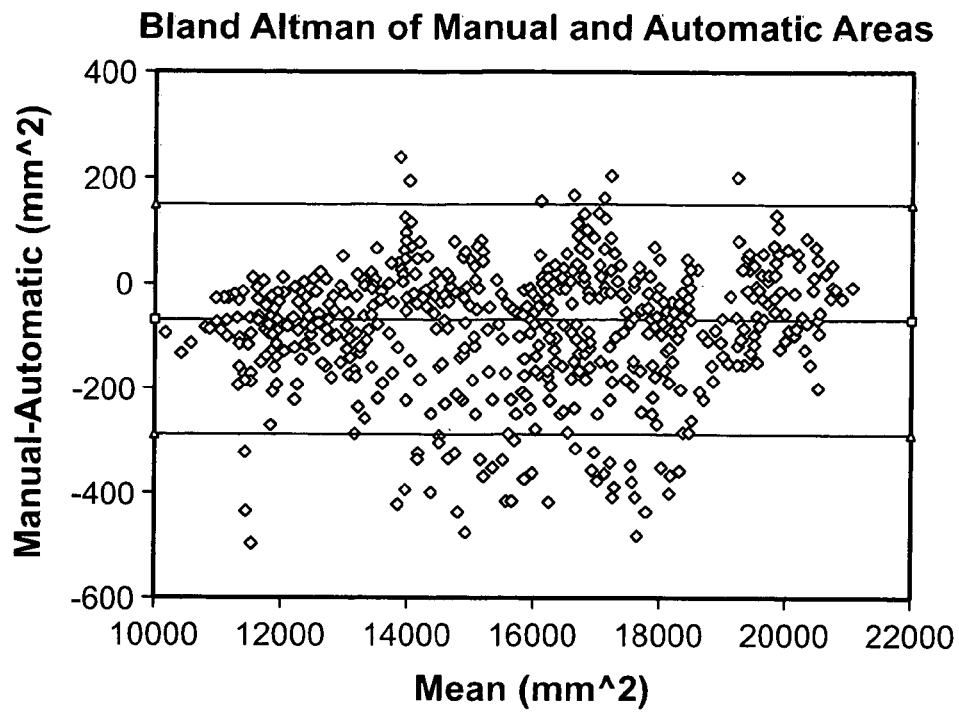
FIG. 8A depicts a Bland-Altman plot that shows a comparison between an embodiment of the present automated method of smoothing and manual tracing.
Figure 8B:
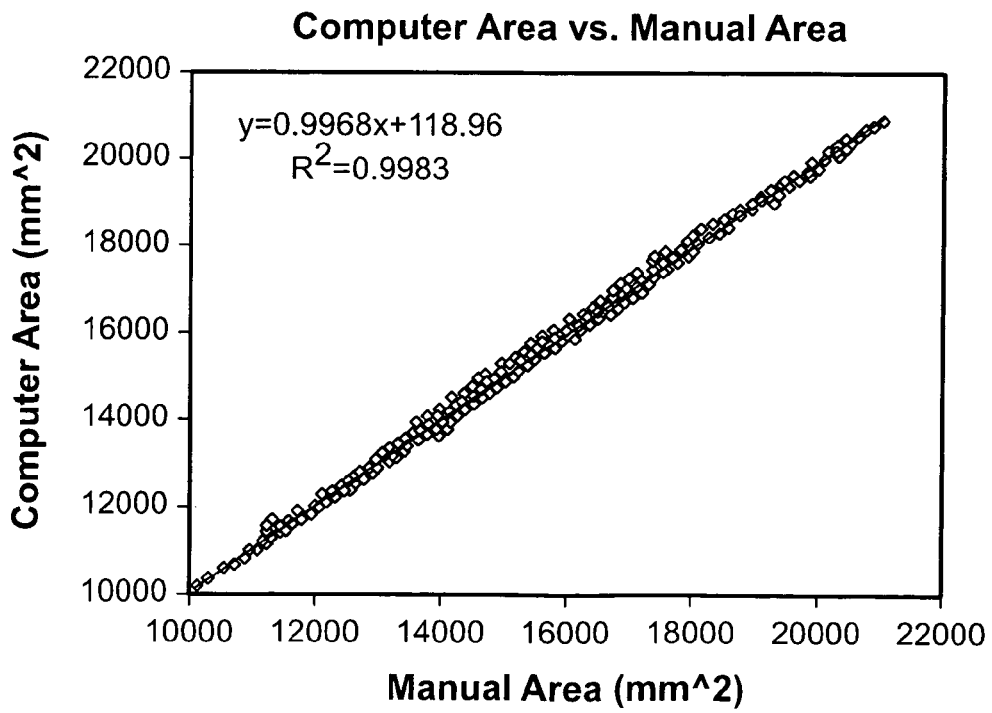
FIG. 8B depicts a comparison between manually-computed and automatically-computed cross-sectional areas.

FIG. 8A a comparison between the manually-defined borders and the automatically-defined borders using a Bland-Altman plot [9]. FIG. 8B shows a comparison between manually-computed and automatically-computed cross-sectional areas (y=0.9968x+118.96 mm², r²=0.9983). Both of these figures show that the automatic area is higher than the manual area on average. This can be attributed to the fact that 3-D smoothing causes the algorithm result to encompass some more regions than those that have been manually segmented.

6.0 Smoothness Quantification

For a parametric representation of a 2-D contour c(t)=(x(t),y(t)), the curvature k(t) of c(t) is given by [10]:

$$k(t) = \frac{\dot{x}(t)\ddot{y}(t) - \ddot{x}(t)\dot{y}(t)}{(\dot{x}(t)^2 + \dot{y}(t)^2)^{\frac{3}{2}}}.$$

Thus in order to calculate the curvature we calculated the first and second derivatives of the signals x(t) and y(t). We used a multiscale curvature estimation technique using the Fourier transform of the complex contour representation u(t)=x(t)+jy (t), described in [10]. This technique allows the calculation of curvature of a contour at multiple scales, given by $$k(t, a) = \frac{-\text{Im}\{\dot{u}(t, a)\ddot{u}^*(t, a)\}}{|\dot{u}(t, a)|^3},$$

where Im refers to the imaginary part. The parameter a describes the scale factor, which is actually the standard deviation term of the Gaussian function which is convolved with u(t) to give $$u(t, a) = u(t) * \left(\frac{1}{a\sqrt{2\pi}} \epsilon^{\frac{-t^2}{2a^2}}\right),$$

where * is a convolution. By varying the parameter a, we can get the value of curvature at points on the contour at different scales.

Figure 9A:
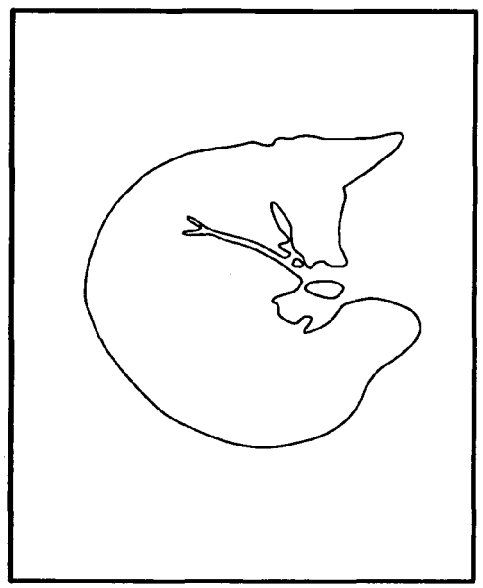
FIGS. 9A and 9B show two lung contours, before and after smoothing, respectively, which have mean curvature values of 0.047 (FIG. 9A) and 0.015 (FIG. 9B).
Figure 9B:
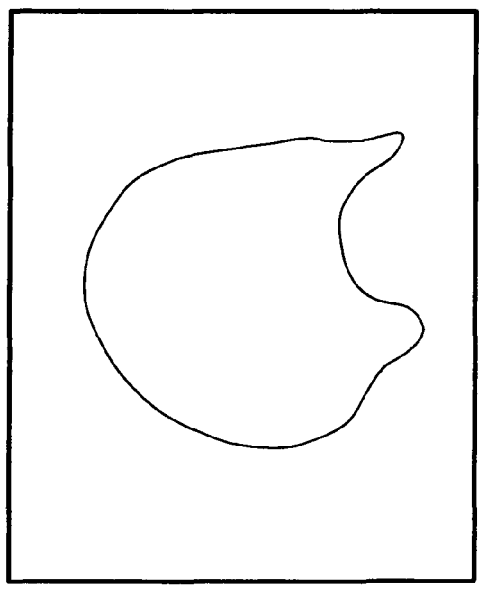

To evaluate the effectiveness of smoothing we calculated the mean of the magnitude of curvature at a very low scale (a=0.01), over all images that included a portion of the mediastinal lung boundary both before and after smoothing. The values obtained are 0.0450 before smoothing and 0.0167 post smoothing, which indicate a considerable increase in the smoothness of the contour. FIGS. 9A and 9B show two lung contours, before and after smoothing respectively, which have mean curvature values of 0.047 (FIG. 9A) and 0.015 (FIG. 9B).

The results show that there is good agreement between manual segmentation and our computer segmentation and smoothing as measured by an average 2-D RMS error of 0.8691 mm and a 2-D similarity index value 0.9958. Also, on an average our human analyst reported an editing time of 30 seconds per image per lung, while our automated segmentation and smoothing operations used five to six minutes for an entire volumetric dataset of images.

The subjects from which the 8 volumetric datasets were created were scanned in the supine position (spine down on the table), with the head being the first thing entering the scanner. The present methods will work for other body orientations (such as prone, in which the spine is up), the implementor of the method used should be aware of the orientation of his or her subject(s) and make straightforward adjustments, well known in the art, to properly apply the current smoothing techniques.

As will be understood by those having skill in the art and the benefit of this disclosure, the steps disclosed above, and the techniques for carrying them out, may be implemented in any number of various media or devices. The referenced methods may take the form of machine (e.g., computer) readable instructions on computer readable media (e.g., software). The computer-readable, or machine-readable, media may take many forms, including any data storage device that can store data that can afterwards be read by a computer or a computer system, including a disk, such as a floppy disk, a zip disk, or the like; a server; memory such as read-only memory, random access memory or memory stored in any suitable medium, such as CD-ROMs; a memory card; a memory stick; magnetic tape; optical data storage devices, SMARTMEDIA® cards; flash memory; compact flash memory; and the like.

The computer readable medium can also be distributed over network-coupled computer systems so that the computer readable instructions are stored and executed in a distributed fashion. For example, the computer readable medium may take the form of a carrier wave such as, for example, signals on a wire (e.g., signals downloaded from the Internet; such as an executable program that is transmitted over a computer network) or those that are transmitted electromagnetically or through infra red means. Furthermore, when the machine readable instructions in question have been loaded onto a given machine, that machine can be described as configured to take whatever actions are defined by the instructions.

In another embodiment, any of the present methods may be embodied in a microprocessor, such as an integrated circuit like as application specific integrated circuit (ASIC), or in a field programmable gate array (FPGA). In another embodiment, any of the present methods may be embodied by a combination of hardware and software; for instance, certain instructions may be executed by a chip running appropriate firmware. In another embodiment, any of the present methods may be embodied by a kit, such as a software developer's kit. Such a kit may include not only software, but also any corresponding hardware to execute the software. For instance, a kit may include a computer board along with drivers and software to be run by that board. Those having skill in the art will recognize that the present methods may be implemented by other means known in the art to achieve an identical or similar result. All such means are considered to be within the scope of the present methods and systems that include devices configured to carry out the present methods.

The appended claims are not to be interpreted as including means-plus-function limitations, unless such a limitation is explicitly recited in a given claim using the phrase(s) "means for" and/or "step for," respectively.

REFERENCES

The following references are referred to by number within this disclosure, and each of them is incorporated by reference into this application:

1. M. S. Brown, M. F. McNitt-Gray, N. J. Mankovich, J. G. Goldin, J. Hiller, L. S. Wilson, and D. R. Aberle, Method for segmenting chest CT image data using an anatomic model: Preliminary results, *IEEE Trans. Medical Imaging* December 1997; 16: 828-839.
2. S. Hu, J. M. Reinhardt, and E. A. Hoffman, Automatic lung segmentation for accurate quantitation of volumetric X-ray CT images, *IEEE Trans. Medical Imaging* 2001; 20(6): 490-498.
3. S. G. Armato, M. L. Giger, C. J. Moran, J. T. Blackburn, K. Doi, and H. MacMahon, Computerized detection of pulmonary nodules on CT scans, *Radiographics* 1999; 19(5): 1301-1311.
4. Y. Li, Y. Zheng, M. Kallergi, and R. A. Clark, Improved method for automatic detection of lung regions in chest radiographs, *Acad. Radiology* 2001; 8: 629-638.
5. Appendix 1 to the '184 provisional application. Appendix 1 constitutes aspects of J. Tschirren, Segmentation, Anatomical Labeling, Branchpoint Matching, and Quantitative Analysis of Human Airway Trees in Volumetric CT Images. Ph.D. thesis, The University of Iowa, 2003.
6. K. Palagyi, J. Tschirren, and M. Sonka, Quantitative analysis of intrathoracic airway trees: methods and validation, in *Proc. 18th Int. Conf. Information Processing in Medical Imaging*, IPMI 2003, Ambleside, UK, Lecture Notes in Computer Science 2003; 2732(7): 222-233.
7. B. M. Dawant, S. L. Hartmann, J. P. Thirion, F. Maes, D. Vandermeulen, and P. Demaerel, Automatic 3-D segmentation of internal structures of the head in MR images using a combination of similarity and free-form transformation:

Part I, methodology and validation on normal subjects, *IEEE Trans. Medical Imaging* 1999; 18(10): 909-916.

8. V. Chalana and Y. Kim, A methodology for evaluation of boundary detection algorithms on medical images, *IEEE Trans. Medical Imaging* 1997; 16(5): 642-652.

9. J. M. Bland and D. G. Altman, Statistical methods for assessing agreement between two methods of clinical measurement, *Lancet* 1986; 1(8476): 307-310.

10. L. da Fontoura Costa and R. M. Cesar Jr., Shape analysis and classification, *CRC Press*, Boca Raton, Fla., 2001.

11. S. Ukil and J. M. Reinhardt, Smoothing Lung Segmentation Surfaces in 3-D X-ray CT images using Anatomic Guidance, *SPIE Conf. Medical Imaging* 2004, 5370: 1066-1075.

Each of the following patents, patent applications and references is also incorporated by reference into this application:

The '974 application;

The '184 provisional application, including each of its 4 appendices;

U.S. Patent Application Pub. No. US 2003/0099384 A1;
U.S. Patent Application Pub. No. US 2003/0099389 A1;
U.S. Patent Application Pub. No. US 2003/0099390 A1;
U.S. Patent Application Pub. No. US 2003/0223627 A1;
U.S. Patent Application Pub. No. US 2002/0114503 A1;
U.S. Patent Application Pub. No. US 2003/0095696 A1;
U.S. Pat. No. 6,724,925;

K. Hohne and W. A. Hanson, Interactive 3D segmentation of MRI and CT volumes using morphological operations, *Journal of Computer Assisted Tomography,* 16(2): 285-294, March/April;

G. Lohmann et al., Automatic labelling of the human cortical surface using sulcal basins, *Medical Image Analysis,* 4(2000): 179-188;

B. W. Reutter et al., Nonlinear edge preserving smoothing and segmentation of 4-D medical images via scale-space fingerprint analysis, *IPMI* 2001: 17$^{th}$ *Int'l Conference*, pages 431-437; and V. Megalooikonomou et al., Fast and effective characterization of 3D region data, in *Proc. of the IEEE International Conference on Imaging Processing (ICIP)* 2002, pp. 421-424, Rochester, N.Y., September 2002.

We claim:

1. An automated method for smoothing a segmented lung volume, the automated method comprising:
    accessing a volumetric dataset of images containing a segmented lung volume that does not include the trachea, the right main bronchus, or the left main bronchus, but that does include a mediastinal boundary; and
    performing smoothing operations on lung contours within images contained within a three-dimensional (3-D) boundary that encloses the mediastinal boundary of the segmented lung volume, the 3-D boundary having a top and a bottom, the 3-D bounding structure including fewer than all of the images in the volumetric dataset.

2. The automated method of claim 1 in which the 3-D boundary is defined at the top by the apical-most image in the volumetric dataset that contains an airway segment lying outside the segmented lung volume.

3. The automated method of claim 2 in which the 3-D boundary is defined at the bottom by the basal-most image in the volumetric dataset that contains an airway segment lying outside the segmented lung volume.

4. The automated method of claim 1 in which the volumetric dataset includes 300 to 600 images taken with a computed tomography scanner.

5. The automated method of claim 4 in which the images in the volumetric dataset are each 0.5 millimeters thick.

6. The automated method of claim 1 in which the smoothing operations include:
    using top discs of increasing size to smooth lung contours within a top set of images in the 3-D boundary such that a first top disc used to smooth a lung contour within a first top image has a smaller radius than a second top disc used to smooth a lung contour within a second top image that is located farther from the top of the 3-D boundary than the first top image.

7. The automated method of claim 6 in which the radii of the top discs of increasing size range from 0 pixels to 30 pixels.

8. The automated method of claim 7 in which 10 top discs are used.

9. The automated method of claim 6 in which the smoothing operations also include:
    using bottom discs of increasing size to smooth lung contours within a bottom set of images in the 3-D boundary such that a first bottom disc used to smooth a lung contour within a first bottom image has a smaller radius than a second bottom disc used to smooth a lung contour within a second bottom image that is located farther from the bottom of the 3-D boundary than the first bottom image.

10. The automated method of claim 9 in which the radii of the bottom discs of increasing size range from 0 pixels to 30 pixels.

11. The automated method of claim 10 in which 10 bottom discs are used.

12. The automated method of claim 9 in which the smoothing operations also include:
    using morphological closing with a 3-D structuring element to smooth lung contours within images located between the images in the top set and the bottom set, thus achieving an initial smoothed lung volume within the 3-D boundary.

13. The automated method of claim 12 in which the 3-D structuring element is an ellipsoid.

14. The automated method of claim 13 in which the ellipsoid has an X dimension of 1.8 centimeters, a Y dimension of 1.8 centimeters, and a Z dimension of 0.9 centimeters.

15. The automated method of claim 12 in which the 3-D structuring element is a sphere.

16. The automated method of claim 12 in which the smoothing operations also include:
    determining a difference between the initial smoothed lung volume and the segmented lung volume yield a first intermediate smoothed lung volume.

17. The automated method of claim 16 in which the smoothing operations also include:
    performing a 3-D connected component analysis on the first intermediate smoothed lung volume to yield one or more volumetric regions.

18. The automated method of claim 17 in which the smoothing operations also include:
    determining which volumetric regions to retain to achieve a final smoothed lung volume, the determining including retaining a volumetric region if the volumetric region overlap a previously-segmented airway tree.

19. The automated method of claim 18 in which the determining includes discarding a volumetric region if the volumetric region does not overlap the previously-segmented airway tree.

20. The automated method of claim 19 in which the smoothing operations are performed on one lung at a time.

21. A non-transitory computer readable medium comprising machine readable instructions for performing at least the steps of any of claims 1-20.

22. A computer system configured to perform at least the steps of any of claims 1-20.

23. The computer system of claim 22 in which the computer system includes multiple computers networked together.

24. The computer system of claim 23 in which the Internet is used to network some of the multiple computers together.

25. The computer system of claim 23 in which an intranet is used to network some of the multiple computers together.

26. A microprocessor configured to perform at least the steps of any of claims 1-20.

27. The microprocessor of claim 26 in which the microprocessor includes an application specific integrated circuit.

28. An automated method for smoothing a segmented lung volume, the automated method comprising:
   accessing a volumetric dataset of images containing a segmented lung volume that does not include the trachea, the right main bronchus, or left main bronchus, but that does include a mediastinal boundary;
   defining a three-dimensional (3-D) boundary that encloses the mediastinal boundary of the segmented lung volume, the 3-D boundary having:
   a top characterized by the apical-most image in the volumetric dataset that contains an airway segment lying outside the segmented lung volume;
   a bottom characterized by the basal-most image in the volumetric dataset that contains an airway segment lying outside the segmented lung volume;
   X-direction borders characterized by the minimum and maximum extent of the segmented lung volume calculated across all images starting from the top to the bottom; and
   Y-direction borders characterized by the minimum and maximum extent of the segmented lung volume calculated across all images starting from the top to the bottom; and
   performing smoothing operations only on lung contours within images contained within the three-dimensional (3-D) boundary.

29. The automated method of claim 28 in which the volumetric dataset includes 300 to 600 images taken with a computed tomography scanner.

30. The automated method of claim 29 in which the images in the volumetric dataset are each 0.5 millimeters thick.

31. The automated method of claim 28 in which the smoothing operations include:
   using top discs of increasing size to smooth lung contours within a top set of images in the 3-D boundary such that a first top disc used to smooth a lung contour within a first top image has a smaller radius than a second top disc used to smooth a lung contour within a second top image that is located farther from the top of the 3-D boundary than the first top image.

32. The automated method of claim 31 in which the radii of the top discs of increasing size range from 0 pixels to 30 pixels.

33. The automated method of claim 32 in which 10 top discs are used.

34. The automated method of claim 31 in which the smoothing operations also include:
   using bottom discs of increasing size to smooth lung contours within a bottom set of images in the 3-D boundary such that a first bottom disc used to smooth a lung contour within a first bottom image has a smaller radius than a second bottom disc used to smooth a lung contour within a second bottom image that is located farther from the bottom of the 3-D boundary than the first bottom image.

35. The automated method of claim 34 in which the radii of the bottom discs of increasing size range from 0 pixels to 30 pixels.

36. The automated method of claim 35 in which 10 bottom discs are used.

37. The automated method of claim 34 in which the smoothing operations also include:
   using morphological closing with a 3-D structuring element to smooth lung contours within images located between the images in the top set and the bottom set, thus achieving an initial smoothed lung volume within the 3-D boundary.

38. The automated method of claim 37 in which the 3-D structuring element is an ellipsoid.

39. The automated method of claim 38 in which the ellipsoid has an X dimension of 1.8 centimeters, a Y dimension of 1.8 centimeters, and a Z dimension of 0.9 centimeters.

40. The automated method of claim 37 in which the 3-D structuring element is a sphere.

41. The automated method of claim 37 in which the smoothing operations also include:
   determining a difference between the initial smoothed lung volume and the segmented lung volume to yield a first intermediate smoothed lung volume.

42. The automated method of claim 41 in which the smoothing operations also include:
   performing a 3-D connected component analysis on the first intermediate smoothed lung volume to yield one or more volumetric regions.

43. The automated method of claim 42 in which the smoothing operations also include:
   determining which volumetric regions to retain to achieve a final smoothed lung volume, the determining including retaining a volumetric region if the volumetric region overlap a previously-segmented airway tree.

44. The automated method of claim 43 in which the determining includes discarding a volumetric region if the volumetric region does not overlap the previously-segmented airway tree.

45. The automated method of claim 44 in which the smoothing operations are performed on one lung at a time.

46. A tangible non-transitory computer readable medium comprising machine readable instructions for performing at least the steps of any of claims 28-45.

47. A computer system configured to perform at least the steps of any of claims 28-45.

48. The computer system of claim 47 in which the computer system includes multiple computers networked together.

49. The computer system of claim 48 in which the Internet is used to network some of the multiple computers together.

50. The computer system of claim 48 in which an intranet is used to network some of the multiple computers together.

51. A microprocessor configured to perform at least the steps of any of claims 28-45.

52. The microprocessor of claim 51 in which the microprocessor includes an application specific integrated circuit.

* * * * *

UNITED STATES PATENT AND TRADEMARK OFFICE
CERTIFICATE OF CORRECTION

PATENT NO. : 8,073,210 B2
APPLICATION NO. : 11/355321
DATED : December 6, 2011
INVENTOR(S) : Reinhardt et al.

Page 1 of 1

It is certified that error appears in the above-identified patent and that said Letters Patent is hereby corrected as shown below:

Replace the paragraph at column 1, lines 15-17 with
--This invention was made with government support under Grant No. HL64368 awarded by the National Institutes of Health and Grant No. 0092758 awarded by National Science Foundation. The government has certain rights in the invention.--.

Column 15, line 21, insert --the-- between "or" and "left".

Column 16, line 48, delete "tangible".

Signed and Sealed this
Twenty-first Day of February, 2012

David J. Kappos
*Director of the United States Patent and Trademark Office*